United States Patent
Oiwa et al.

(10) Patent No.: US 9,500,780 B2
(45) Date of Patent: Nov. 22, 2016

(54) ILLUMINATION DEVICE AND DISPLAY APPARATUS

(75) Inventors: Tatsuya Oiwa, Tokyo (JP); Kazuyuki Takahashi, Kanagawa (JP); Koji Miura, Tokyo (JP)

(73) Assignee: Sony Corporation, Tokyo (JP)

( * ) Notice: Subject to any disclaimer, the term of this patent is extended or adjusted under 35 U.S.C. 154(b) by 166 days.

(21) Appl. No.: 13/512,838

(22) PCT Filed: Sep. 30, 2011

(86) PCT No.: PCT/JP2011/072522
§ 371 (c)(1),
(2), (4) Date: May 30, 2012

(87) PCT Pub. No.: WO2012/046644
PCT Pub. Date: Apr. 12, 2012

(65) Prior Publication Data
US 2012/0242960 A1    Sep. 27, 2012

(30) Foreign Application Priority Data

Oct. 4, 2010  (JP) ................. 2010-224633
Sep. 27, 2011 (JP) ................. 2011-210443

(51) Int. Cl.
*G02B 27/10* (2006.01)
*G02B 3/00* (2006.01)
(Continued)

(52) U.S. Cl.
CPC ........... *G02B 3/0056* (2013.01); *G02B 3/0062* (2013.01); *G02B 5/045* (2013.01); *G02B 5/1871* (2013.01);
(Continued)

(58) Field of Classification Search
CPC .......... G02B 27/10; G02B 17/10; G02B 21/00
USPC ................... 353/98; 359/290, 629
See application file for complete search history.

(56) References Cited

U.S. PATENT DOCUMENTS

2003/0039036 A1* 2/2003 Kruschwitz et al. ......... 359/707
2010/0039585 A1   2/2010 Nakayama et al.
(Continued)

FOREIGN PATENT DOCUMENTS

JP  55-065940  5/1980
JP  06-208089  7/1994
(Continued)

OTHER PUBLICATIONS

Japanese Office Action issued Oct. 29, 2013 in corresponding Japanese Patent Application No. 2012-258263.
(Continued)

*Primary Examiner* — Steven H Whitesell Gordon
*Assistant Examiner* — Jerry Brooks
(74) *Attorney, Agent, or Firm* — K&L Gates LLP

(57) ABSTRACT

Provided are an illumination device and a display apparatus capable of reducing generation of an interference pattern, while achieving downsizing and enhancing light use efficiency. An illumination device includes: a light source section that includes a laser light source; an optical device disposed on a light path through which laser light from the laser light source travels; an optical member that outputs illumination light; and a driving section that displaces a relative position between the optical device and the optical member to vary at least one of an incidence position and an incidence angle, in an incidence surface of the optical member, of the laser light.

11 Claims, 17 Drawing Sheets

(51) Int. Cl.

| | | |
|---|---|---|
| G02B 27/48 | (2006.01) | |
| H04N 9/31 | (2006.01) | |
| G02B 5/04 | (2006.01) | |
| G02B 5/18 | (2006.01) | |
| G02B 27/09 | (2006.01) | |
| G02B 27/14 | (2006.01) | |
| G02B 27/42 | (2006.01) | |
| G03B 21/20 | (2006.01) | |

(52) U.S. Cl.
CPC ....... *G02B 27/0927* (2013.01); *G02B 27/1033* (2013.01); *G02B 27/141* (2013.01); *G02B 27/425* (2013.01); *G02B 27/48* (2013.01); *G03B 21/208* (2013.01); *G03B 21/2033* (2013.01); *H04N 9/3111* (2013.01); *H04N 9/3161* (2013.01)

(56) References Cited

U.S. PATENT DOCUMENTS

2010/0053565 A1* 3/2010 Mizushima et al. ............ 353/38
2010/0165307 A1* 7/2010 Mizushima et al. ............ 353/98
2011/0235003 A1 9/2011 Konno

FOREIGN PATENT DOCUMENTS

| JP | 2003-098476 | | 4/2003 |
|---|---|---|---|
| JP | 2004-138669 | A1 | 5/2004 |
| JP | 2009-169012 | | 7/2009 |
| JP | 2009-216843 | | 9/2009 |
| WO | 2006/090681 | A1 | 8/2006 |
| WO | 2008/081564 | A1 | 7/2008 |
| WO | 2008/114502 | | 9/2008 |
| WO | 2008/152781 | | 12/2008 |
| WO | 2009/019973 | | 2/2009 |
| WO | 2009/054124 | | 4/2009 |

OTHER PUBLICATIONS

International Search Report issued Nov. 1, 2011 in corresponding PCT Application No. PCT/JP2011/072522.
Chinese Office Action issued Mar. 21, 2014 in corresponding Chinese Patent Application No. 201180004653.1.

* cited by examiner

FIG. 13

| PARAMETER | NUMERICAL VALUE | UNIT |
|---|---|---|
| R (+) | 1.582 | mm |
| R (−) | −1.334 | mm |
| F (+) | 2.891 | mm |
| F (−) | −2.438 | mm |
| P (+) | 0.304 | mm |
| P (−) | 0.256 | mm |
| θ (+) | −3.00 | degree |
| θ (−) | 3.00 | degree |
| LP | 0.22 | mm |
| P | 0.28 | mm |

(A)

(B)

ILLUMINATION DEVICE AND DISPLAY APPARATUS

CROSS REFERENCES TO RELATED APPLICATIONS

The present application is a national stage of International Application No. PCT/JP2011/072522 filed on Sep. 30, 2011 and claims priority to Japanese Patent Application No. 2010-224633 filed on Oct. 4, 2010, and Japanese Patent Application No. 2011-210443 filed on Sep. 27, 2011, the disclosures of which are incorporated herein by reference.

BACKGROUND

The disclosure relates to an illumination device for radiating light including laser light, and to a display apparatus for performing an image display with use of the illumination device.

Optical modules, which are one of the main component of projectors (projection type display apparatus), typically include an illumination optical system (illumination device) including a light source, and an optical system for projection (projection optical system) including a light modulation device. In recent years, small-size (palm-size) and light-weight portable projectors which are called micro projector are becoming widely used in the area of the projector. In the past, in the micro projector, LED (Light Emitting Diode) has been mainly used as a light source of an illumination device.

On the other hand, nowadays, a laser is drawing attention as a new light source of the illumination device. For example, as a projector using laser light of three primary colors of red (R), green (G), and blue (B), a projector using a gas laser has been known. The projector using a laser as a light source is proposed in, for example, Patent Documents 1 and 2. When a laser is adopted as a light source, a projector which provides a wide range of color reproduction and small power consumption can be obtained.

SUMMARY

Incidentally, when coherent light such as laser light is radiated on a diffusion surface, a spotted pattern which does not appear in the case of normal light appears. Such a pattern is called the speckle pattern. The speckle pattern is generated due to mutual interference of light beams scattered at respective point on the diffusion surface in a random phase relationship corresponding to a microscopic irregularity on the surface.

In the above-described projector using a laser as a light source, the speckle pattern (the interference pattern) is superimposed on a display image on a screen. Hence, the human eyes recognize it as a strong random noise, which results in degraded image quality. Therefore, the generation of the speckle pattern is an issue common to the cases where the laser light having coherence is used as a light source, and, various approaches to reducing the generation of the speckle pattern (speckle noise) have been made.

For example, in a projector using a laser as a light source, which is disclosed in Patent Document 1 described above, a screen is minutely oscillated with use of a piezoelectric device in order to reduce the generation of the speckle pattern. In general, the human eyes and brain cannot discriminate a flicker in an image in the range from approximately 20 to 50 ms. In other words, images within that range are integrated and averaged in the eyes. In view of this, a multitude of independent speckle patterns are superimposed on the screen in that time range so as to average the speckle noise to the extent that the speckle noise is not annoying to the human eyes. However, since in this method the large-sized screen itself has to be minutely oscillated, there is an issue in which a configuration of the apparatus may become larger.

On the other hand, in the Patent Document 2 described above, a diffusion device is mechanically rotated to displace a position of a speckle pattern on a screen at high speed, so that the speckle noise is prevented from being detected by the human eyes. However, since in this method the diffusion device is used in order to diffuse light, there is an issue in which light use efficiency may be decreased.

The disclosure has been made in view of such issues, and an object thereof is to provide an illumination device and a display apparatus capable of reducing the generation of an interference pattern, while achieving downsizing and enhancing light use efficiency.

An illumination device according to the disclosure includes: a light source section including a laser light source; an optical device disposed on a light path through which laser light from the laser light source travels; an optical member outputting illumination light; and a driving section displacing a relative position between the optical device and the optical member to vary at least one of an incidence position and an incidence angle, in an incidence surface of the optical member, of the laser light.

A display apparatus according to the disclosure includes: the illumination device according to the disclosure described above; and a light modulation device modulating illumination light from the illumination device based on an image signal.

In the illumination device and the display apparatus according to the disclosure, the relative position between the optical device disposed on the light path through which the laser light travels and the optical member that outputs the illumination light is displaced. Thereby, generation of an interference pattern caused by the laser light is reduced. Also, at least one of the incidence position and the incidence angle (the incidence position, the incidence angle, or both of the incidence position and the incidence angle) of the laser light is varied in the incidence surface of the optical member. Hence, even when the relative position described above is displaced, light loss at the time when light enters the optical member from the optical device is reduced or avoided.

According to the illumination device and the display apparatus of the disclosure, the relative position between the optical device disposed on the light path through which the laser light travels and the optical member that outputs the illumination light is displaced to vary at least one of the incidence position and the incidence angle, in the incidence surface of the optical member, of the laser light. This makes it possible to reduce the generation of the interference pattern caused by the laser light, while reducing or avoiding the light loss at the time when light enters the optical member from the optical device. Hence, it is possible to reduce the generation of the interference pattern (possible to improve image quality), while achieving downsizing and enhancing light use efficiency.

Additional features and advantages are described herein, and will be apparent from the following Detailed Description and the figures.

BRIEF DESCRIPTION OF THE FIGURES

FIG. 13 illustrates an example of respective parameters illustrated in FIG. 12.

DETAILED DESCRIPTION

Hereinafter, an embodiment of the disclosure will be described in detail with reference to the drawings. The description will be made in the following order.
1. Embodiment (an example in which a prism array is used as an optical device)
2. Modification Examples
  Modification Example 1 (an example in which a prism array is provided with a diffraction grating)
  Modification Example 2 (an example in which a diffraction device is used as an optical device)
  Modification Example 3 (an example in which a lens (collimator lens) is used as an optical device)
  Modification Example 4 and 5 (an example in which an optical device having a convex-shaped curved surface and a concave-shaped curved surface is used)
  Modification Example 6 (an example in which a micro-lens array is used as an optical device)
  Modification Example 7 (an example in which a plurality of optical devices are arranged along an optical axis)
  Modification Example 8 (a method for changing a relative position relationship between an optical device and a fly-eye lens)
  Other Modification Examples

EMBODIMENT

General Configuration of Display Apparatus 3

Figure 1:
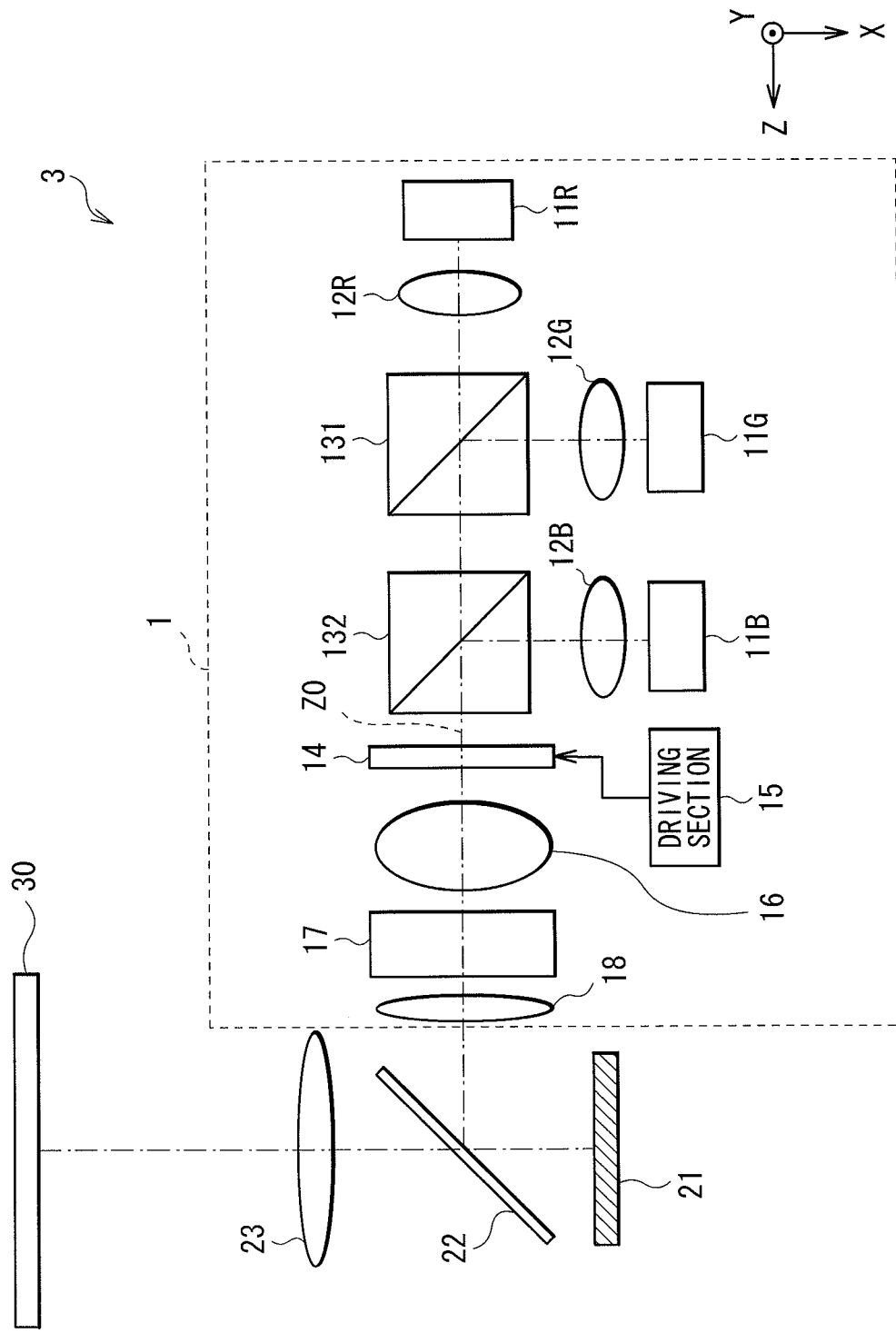
FIG. 1 illustrates a general configuration of a display apparatus according to an embodiment of the disclosure.

FIG. 1 illustrates a general configuration of a display apparatus (display apparatus 3) according to an embodiment of the disclosure. The display apparatus 3 is a projection type display apparatus for projecting an image (image light) onto a screen 30 (projected surface), and includes an illumination device 1 and an optical system (a display optical system) for performing an image display with use of illumination light from the illumination device 1.
(Illumination Device 1)

The illumination device 1 includes a red laser 11R, a green laser 11G, a blue laser 11B, lenses 12R, 12G, and 12B, dichroic prisms 131 and 132, a prism array 14, a driving section 15, a collimator lens 16, a fly-eye lens 17 and a condenser lens 18. It is to be noted that Z0 shown in the figure denotes an optical axis.

The red laser 11R, green laser 11G, and blue laser 11B are three kinds of light sources which emit red laser light, green laser light, and blue laser light, respectively. A light source section is configured from the three kinds of the laser light sources, and in this case, all of these light sources are laser light sources. Each of the red laser 11R, green laser 11G, and blue laser 11B is, for example, a semiconductor laser, a solid-state laser, or the like. It is to be noted that, in the case where each of these laser light sources is a semiconductor laser, for example, the wavelength $\lambda r$ of the red laser light is approximately 600 to 700 nm; the wavelength $\lambda g$ of the green laser light is approximately 500 to 600 nm; and the wavelength $\lambda b$ of the blue laser light is approximately 400 to 500 nm.

The lenses 12R and 12G are lenses (coupling lenses) which collimate red laser light emitted by the red laser 11R and green laser light emitted by the green laser 11G (into parallel light), respectively, to couple the collimated light with the dichroic prism 131. Likewise, the lens 12B is a lens (coupling lenses) which collimates laser light emitted by the blue laser 11B (into parallel light), to couple the collimated light with the dichroic prism 132. It is to be noted that, although, in this case, the incident laser light is collimated (into parallel light) by the lenses 12R, 12G, and 12B, the incident laser light may not necessarily be collimated (into parallel light) by the lenses 12R, 12G, and 12B. However, it is possible to downsize an apparatus configuration more effectively when the light is collimated in the above-mentioned manner, which is preferable.

The dichroic prism 131 is a prism for selectively transmitting the red laser light incident through the lens 12R, while selectively reflecting the green laser light incident through the lens 12G. The dichroic prism 132 is a prism for selectively transmitting the red laser light and green laser light emitted through the dichroic prism 131, while selectively reflecting the blue laser light incident through the lens 12B. In this way, a color composition (light path synthesis) of the red laser light, the green laser light, and the blue laser light is carried out.

The prism array 14 is disposed on the light path between the light source and the fly-eye lens 17 (on the light path of the laser light; more specifically, on the light path between the dichroic prism 132 and the collimator lens 16), and corresponds to a specific example of "optical device" of the disclosure. The prism array 14 is an optical device for reducing a speckle noise (or an interference pattern) described later, and the laser light that travels along the optical axis Z0 shown in the figure passes through the prism array 14.

Figure 2:
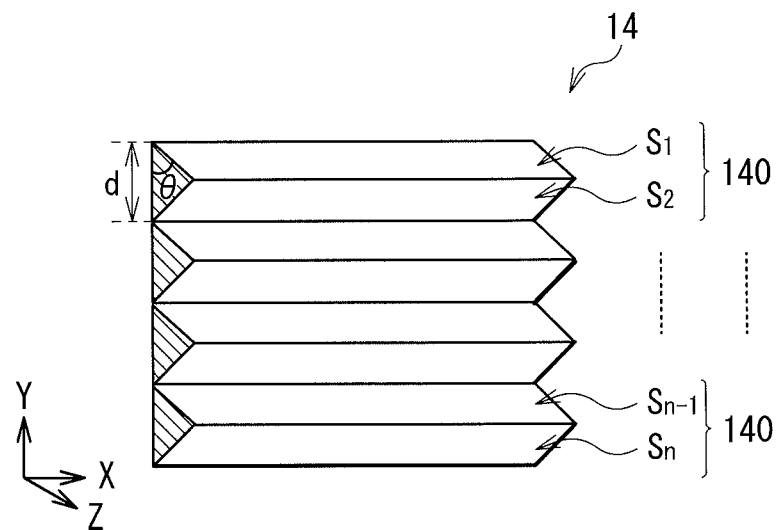
FIG. 2 is a perspective view schematically illustrating a specific configuration of a prism array illustrated in FIG. 1.

FIG. 2 is a perspective view schematically illustrating a specific configuration of the prism array 14. The prism array 14 includes a plurality of (in this case, n/2 (n is an integer greater than or equal to 2)) prisms 140 that are arranged side-by-side along the Y axis direction. Each prism 140 has a pair of inclined surfaces each extending in the X axis direction on the emitting side (+Z axis side) of the laser light. That is, the prisms 140 are arranged side-by-side along a direction (Y axis direction) orthogonal to the extending direction (X axis direction) of the pair of inclined surfaces in a light emission surface (X-Y plane). Specifically, the first prism 140 has a pair of inclined surfaces, an inclined surface (the first plane) $S_1$ and an inclined surface (the second plane) $S_2$, the second prism 140 has a pair of inclined surfaces, an inclined surface (the third plane) $S_3$ and an inclined surface (the fourth plane) $S_4$, . . . , and the (n/2)th prism 140 has a pair of inclined surfaces, an inclined surface $S_{n-1}$ (the (n-1)th plane) and an inclined surface (the nth plane) $S_n$, in order in the negative direction of the Y axis in the figure. Thus, each prism 140 has a triangular prism shape (pitch in the Y axis direction (prism pitch): d, inclination angle of each inclined surface: θ) extending in the X axis direction, and protrusions (convex portions) and depressions (concave portions) are alternately formed over the entire light emission surface. It is to be noted that, in this example, the convex portions (inclined surfaces) are formed on the emission surface side of each prism 140, but this is not limitative. They may be provided on at least one of the incidence surface side and the emission surface side of each prism 14. The specific function of the prism array 14 will be described later (FIG. 4 to FIG. 7).

The driving section 15 displaces a relative position between the prism array 14 and the fly-eye lens 17 to vary at least one of an incidence position and an incidence angle of laser light (the incidence position or the incidence angle, or both of the incidence position and the incidence angle) in the incidence surface of the fly-eye lens 17. In particular, in the present embodiment, as shown in FIG. 1, the driving section 15 oscillates (minutely oscillates) the prism array 14 (specifically, oscillates the prism array along the Y axis direction, which is the array direction of the prisms 140 illustrated in FIG. 2), to displace the relative position described above. The driving section 15 includes such as a coil and a permanent magnet (a permanent magnet made of materials such as neodymium (Nd), iron (Fe), and boron (B), for example), for example. It is to be noted that, an example of each of the above-mentioned displacement of the relative position and the displacement of at least one of the incidence position and the incidence angle includes a periodic displacement (variation), for example, but this is not restrictive. Alternatively, other displacement (variation) methods may be adopted, and this applies to all the following examples. Also, a method of driving by the driving section 15 includes, for example, a method in which the relative position described above is displaced in a reciprocating manner by a drive frequency equal to or higher than a predetermined frequency (for example, 15 Hz).

The collimator lens 16 is arranged on the light path between the prism array 14 and the fly-eye lens 17, and is a lens that collimates light emitted from the prism array 14 into parallel light.

The fly-eye lens 17 is an optical member (integrator) in which a plurality of lenses (a plurality of unit lenses 170 described later) are two-dimensionally arranged on a substrate, and spatially divides incidence light flux in accordance with the arrangement of the lenses to output the divided light fluxes. This uniformizes the light output from the fly-eye lens 17 (a light intensity distribution in a plane is uniformized), and allows the light to be outputted as illumination light. It is to be noted that, the fly-eye lens 17 corresponds to a specific example of the "optical member" of the disclosure.

The condenser lens 18 is a lens for condensing incidence light (illumination light) uniformized by the fly-eye lens 17.

(Display Optical System)

The above-mentioned display optical system includes a polarization beam splitter (PBS) 22, a reflection-type liquid crystal device 21, and a projection lens 23 (projection optical system).

The polarization beam splitter 22 is an optical member which selectively transmits a predetermined polarization (for example, s polarization), and selectively reflects the other polarization (for example, p polarization). Thereby, the illumination light from the illumination device 1 (for example, s polarization) is selectively reflected to enter the reflection-type liquid crystal device 21, and image light (for example, p polarization) output from the reflection-type liquid crystal device 21 is selectively transmitted to enter the projection lens 23.

The reflection-type liquid crystal device 21 is a light modulation device by which, based on an image signal supplied from an unillustrated display control section, the illumination light from the illumination device 1 is modulated and reflected, thereby to output the image light. At this time, reflection is performed in the reflection-type liquid crystal device 21 such that polarization at the time of input and polarization at the time of output (for example, s polarization or p polarization) are different from each other. The reflection-type liquid crystal device 21 includes a liquid crystal device such as LCOS (Liquid Crystal on Silicon), for example.

The projection lens 23 is a lens by which the illumination light (image light) modulated by the reflection-type liquid crystal device 21 is projected (projected in a magnified form) onto the screen 30.

[Function and Effect of Display Apparatus 3]

(1. Display Operation)

In the display apparatus 3, firstly in the illumination device 1, the lenses 12R, 12G, and 12B collimate light (laser light) outputted from the red laser 11R, green laser 11G, and blue laser 11B into parallel light, respectively. Subsequently, the color composition (light path synthesis) of the laser light beams (red laser light, green laser light and blue laser light) which are thus collimated to the parallel light is carried out by the dichroic prisms 131 and 132. The laser light to which the light path synthesis is applied passes through the prism array 14, and then collimated into parallel light by the collimator lens 16, which then enters the fly-eye lens 17. This incidence light is uniformized (intensity distribution in plane is uniformized) by the fly-eye lens 17, and then the light is outputted. Thereafter, the light is condensed by the condenser lens 18. Thus, the illumination light is emitted from the illumination device 1.

Subsequently, the illumination light is selectively reflected by the polarization beam splitter 22, and then enters the reflection-type liquid crystal device 21. In the reflection-type liquid crystal device 21, this incidence light is reflected while being modulated based on the image signal to be outputted therefrom as the image light. At this time, in the reflection-type liquid crystal device 21, polarization at the time of input and polarization at the time of output are different from each other. Hence, the image light outputted from the reflection-type liquid crystal device 21 is selectively transmitted through the polarization beam splitter 22 and then enters the projection lens 23. Thereafter, this incidence light (image light) is projected (projected in a magnified form) onto the screen 30 by the projection lens 23.

At this time, each of the red laser 11R, green laser 11G, and blue laser 11B sequentially emits light in a time-divisional manner (pulse emission) to output laser light (red laser light, green laser light, and blue laser light). In the reflection-type liquid crystal device 21, on the basis of the image signal of each color component (red component, green component, and blue component), laser light of corresponding color is sequentially modulated in a time-divisional manner. Thus, a color image display on the basis of the image signal is performed in the display apparatus 3.

(2. Function of Characterizing Part)

Next, a function of a characterizing part of the disclosure (function of the illumination device 1) is described in detail in comparison with a comparative example.

(2-1. Comparative Example)

Figure 3:
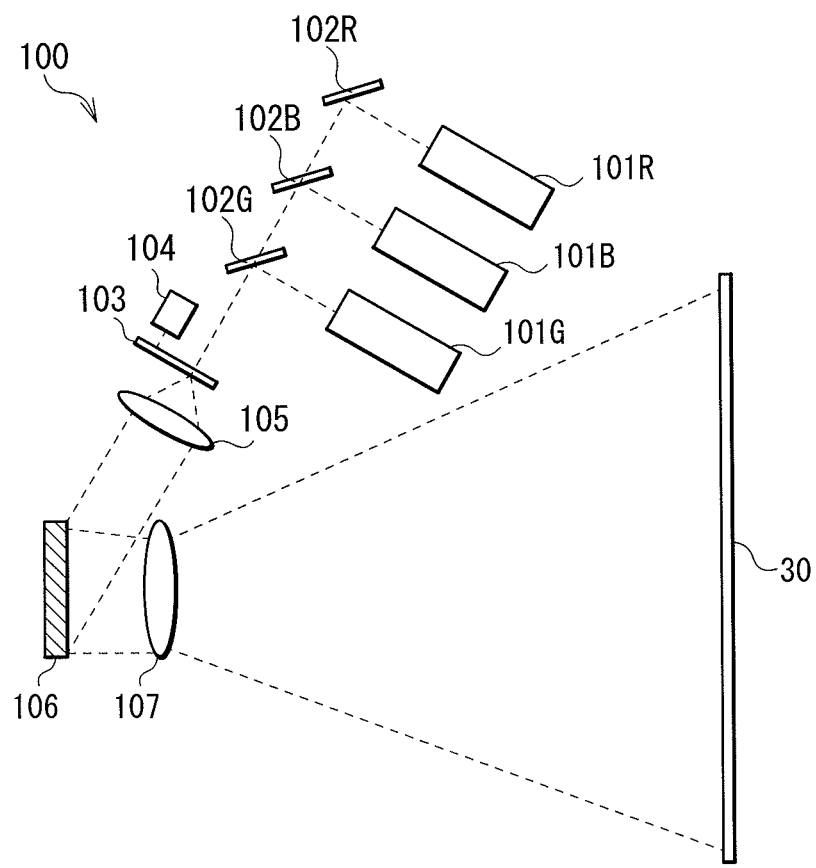
FIG. 3 illustrates a general configuration of a display apparatus according to a comparative example.

FIG. 3 illustrates a general configuration of a display apparatus (display apparatus 100) according to a comparative example. The display apparatus 100 of the comparative example is a display apparatus of a projection type which projects image light onto a screen 30 as in the case with the display apparatus 3 of the present embodiment. The display apparatus 100 includes a red laser 101R, a green laser 101G, a blue laser 101B, dichroic mirrors 102R, 102G, and 102B, a diffusion device 103, a motor (driving section) 104, a lens 105, a light modulation device 106, and a projection lens 107.

In the display apparatus 100, laser light beams of respective colors emitted from the red laser 101R, green laser 101G, and blue laser 101B are subjected to a color composition (light path synthesis) in the respective dichroic mirrors 103R, 103G, and 103B, and then enter the diffusion device 103. This incidence light is diffused by the diffusion device 103, which is then radiated as illumination light to the light modulation device 106 by the lens 105. In the light modulation device 106, this illumination light is reflected while being modulated based on the image signal, to be emitted as image light. Then, the image light is projected (projected in a magnified form) onto the screen 30 by the projection lens 107. In this way, a color image display based on the image signal is performed in the display apparatus 100.

Incidentally, when coherent light such as laser light is radiated on a diffusion surface, a spotted pattern which does not appear in the case of normal light appears. Such a pattern is called the speckle pattern. The speckle pattern is generated due to mutual interference of light beams scattered at respective points on the diffusion surface in a random phase relationship corresponding to a microscopic irregularity on the surface.

In the case of a projector using a laser light source as in the above-described display apparatus 100 of the comparative example, such speckle pattern (an interference pattern) is superimposed on a display image on a screen. Hence, the human eyes recognize it as a strong random noise if no measures are taken, resulting in degraded image quality.

To address this, a method may be contemplated in which a screen is minutely oscillated, in order to reduce the generation of such speckle pattern (a speckle noise) in a projector using a laser light source. In general, the human eyes and brain cannot discriminate a flicker in an image in the range from approximately 20 to 50 ms. In other words, images within that range are integrated and averaged in the eyes. In view of this, a multitude of independent speckle patterns are superimposed on a screen in that time range so as to average the speckle noise to the extent that the speckle noise is not annoying to the human eyes. In this method, however, the large-sized screen itself has to be minutely oscillated. Hence, the configuration of the apparatus may become larger. In addition thereto, increased power consumption, issue on noise, and so on are a concern.

In this regard, the display apparatus 100 of the above-mentioned comparative example mechanically rotates the diffusion device 103 by the motor 104 to displace the position of a speckle pattern on the screen 30 at high speed, so as to reduce the generation of the speckle noise. In this method, however, the diffusion device 103 diffuses light incident on that diffusion device 103, which results in decreased light use efficiency.

(2-2. Embodiment)

In contrast, the illumination device 1 of the present embodiment solves the above-mentioned issue with use of the prism array 14 as follows.

Figure 4:
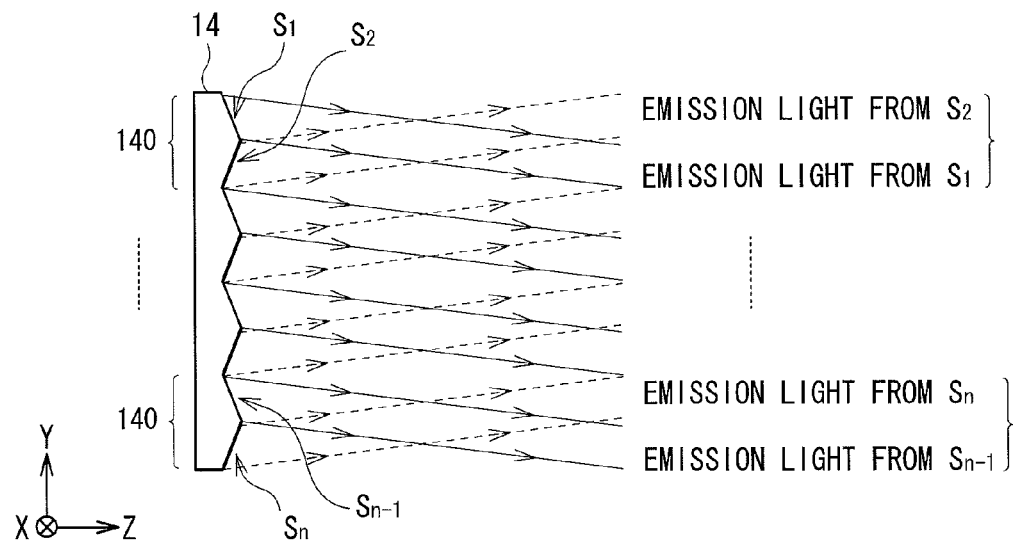
FIG. 4 is a schematic view illustrating a function of the prism array illustrated in FIG. 2.
Figure 5:
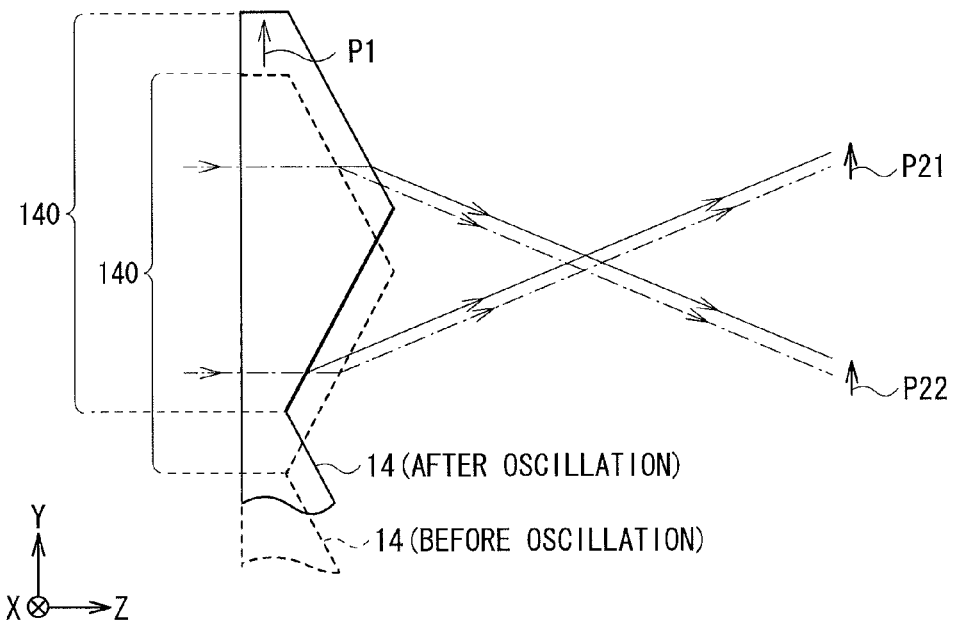
FIG. 5 is a schematic view for describing a beam scanning using an oscillation of the prism array.

Firstly, in the prism array 14, incidence light on each of the prisms 140 is emitted from the pair of inclined surfaces as follows. Specifically, as illustrated in FIG. 4, emission light is emitted such that a position of the incidence light and a position of the emission light on a plane (in this case, on the incidence surface of the fly-eye lens 17) located at a predetermined distance from the prism array 14 are switched with respect to each other in the pair of inclined surfaces of each of the prisms 140. To be more specific, in the first prism 140 of the prism array 14 described above, the incidence position of the incidence light and the position of the emission light on the incidence surface of the fly-eye lens 17 are switched with respect to each other between the inclined surface $S_1$ and the inclined surface $S_2$. That is, the emission light from the inclined surface $S_1$ is emitted toward the incidence position (the lower side in the emission surface of the first prism 140) of the incidence light incident on the inclined surface $S_2$, while the emission light from the inclined surface $S_2$ is emitted toward the incidence position (the upper side in the emission surface of the first prism 140) of the incidence light incident on the inclined surface $S_1$. Likewise, in the (n/2)th prism 140 described above, the incidence position of the incidence light and the position of the emission light on the incidence surface of the fly-eye lens 17 are switched with respect to each other between the inclined surface $S_{n-1}$ and the inclined surface $S_n$. That is, the emission light from the inclined surface $S_{n-1}$ is emitted toward the incidence position (the lower side in the emission surface of the (n/2)th prism 140) of the incidence light incident on the inclined surface $S_n$, while the emission light from the inclined surface $S_n$ is emitted toward the incidence position (the upper side in the emission surface of the (n/2)th prism 140) of the incidence light incident on the inclined surface $S_{n-1}$. It is to be noted that the switching function by which the position of the incidence light and the position of the emission light are switched with respect to each other can be adjusted optionally by setting of the prism pitch d and the inclination angle θ shown in FIG. 2.

The driving section 15 displaces the relative position between the prism array 14 and the fly-eye lens 17. Specifically, as indicated by arrow P1 in FIG. 5 for example, the driving section 15 of the present embodiment oscillates the prism array 14 along the array direction (Y axis direction) of the prisms 140 in the plane orthogonal to the optical axis Z0 to displace the above-mentioned relative position. In other words, the positions of the emission light emitted from the inclined surfaces of each of the prisms 140 described above (the emission light beams that are so emitted that the positions thereof are switched with respect to each other between the pair of inclined surfaces) are also displaced (shifted) along the Y axis direction as indicated by arrows P21 and P21 in FIG. 5 for example. Thereby, beam scanning by the incidence light incident from each of the prisms 140 in the prism array 14 is performed on the incidence surface of the fly-eye lens 17. As a result, by virtue of the above-mentioned principle (multiplexing (or time averaging) of the speckle pattern), the generation of the speckle noise (the interference pattern) caused by the laser light is reduced.

Further, in the present embodiment, the driving section 15 displaces (oscillates) the relative position (prism array 14 itself, in this case) between the prism array 14 and the fly-eye lens 17 such that at least one of the incidence position and the incidence angle of the laser light varies in the incidence surface of the fly-eye lens 17. Thereby, even when the displacement of the relative position (beam scanning) described above is performed, light loss at the time when the light enters the fly-eye lens 17 from the prism array 14 is reduced or avoided. That is, unlike the method of the comparative example mentioned above, the loss of laser light is reduced to the minimum or is avoided in performing the reduction of the speckle noise with the use of the multiplexing (the time averaging) of the speckle noise.

Figure 6:
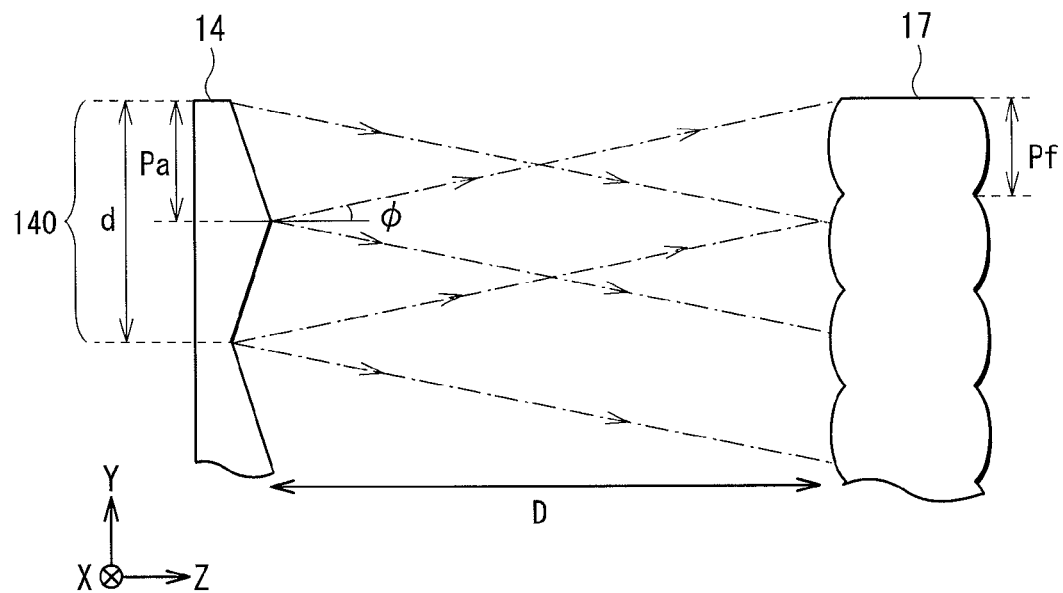
FIG. 6 is a schematic view for describing a relationship between a pitch of the prism array and a pitch of a fly-eye lens.

Incidentally, in the prism array 14, the following Expression (1) is satisfied, where a length of an inclined surface of the prism 140 in the array direction (Y axis direction) is Pa, a distance between the prism array 14 and the fly-eye lens 17 is D, and a refracting angle of the emission light from the prism array 14 is φ, as illustrated in FIG. 6, for example. Meanwhile, it can be said that it is desirable that the following Expression (2) be satisfied in this case.

$$Pa \approx (D \times \tan \phi) \quad (1)$$

$$Pa = (D \times \tan \phi) \quad (2)$$

Also in this case, it is desirable that the following Expression (3) be satisfied, where a pitch of a unit lens of the fly-eye lens 17 is Pf, as illustrated in FIG. 6. In other words, it is desirable that the length Pa of the inclined surface of the prism 140 in the array direction be different from the pitch Pf of the unit lens of the fly-eye lens 17, and be not equal to the integral multiple of the pitch Pf (integral multiple greater than or equal to twofold).

$$Pa \neq (m \times Pf)(m \text{ is an integer greater than or equal to } 1) \quad (3)$$

The reason for this is that, when the length Pa of the prism 140 and the pitch Pf of the fly-eye lens 17 are set so as to satisfy the above-mentioned Expression (3), the generation of a non-irradiated region on the incidence surface of the fly-eye lens 17 is avoided. In other words, the non-irradiated region is prevented from being generated on the reflection-type liquid crystal device 21 serving as a conjugate point.

Figure 7:
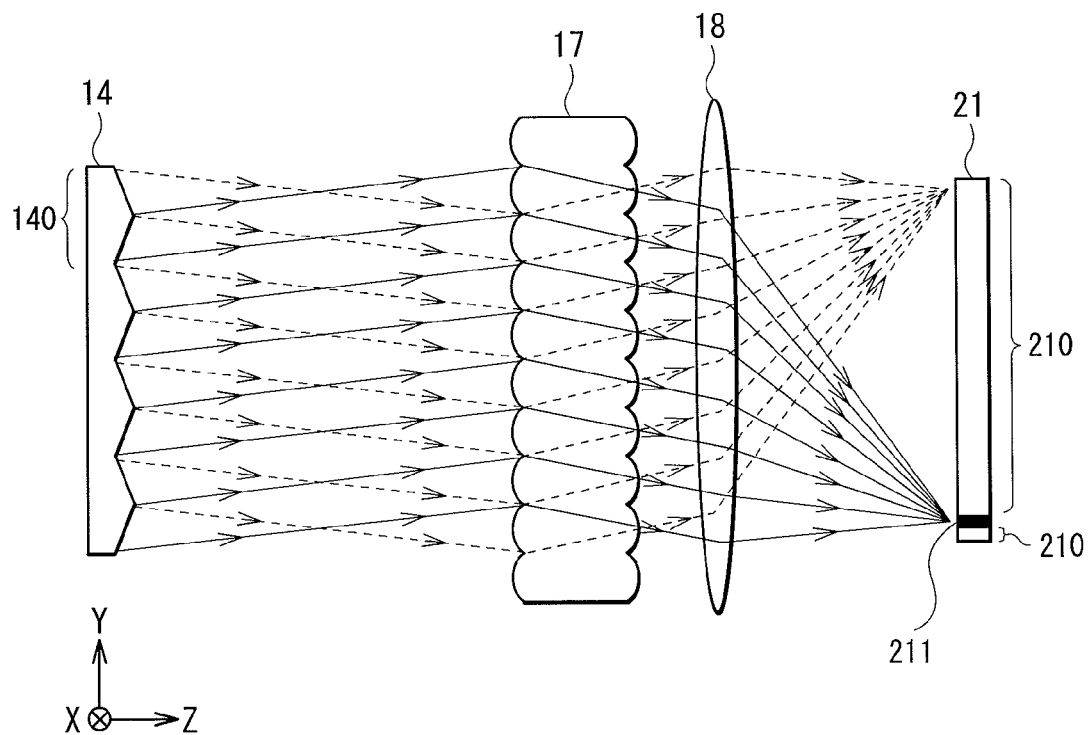
FIG. 7 is a schematic view for describing a principle of the generation of non-irradiated region.

More specifically, in the case where the switching of the positions of the incidence light and the emission light in the prism array 14 is carried out, there is a possibility that the non-irradiated region is generated on the fly-eye lens 17, due to the accuracy of the prism array 14, deviation (misalignment) of the distance from the prism array 14 to the fly-eye lens 17, or the like. In such a case, when the above-mentioned Expression (3) is not satisfied (that is, Pa=(m×Pf) is satisfied), the non-irradiated region may be periodically generated. That is, since the fly-eye lens 17 serves to uniformize the intensity distribution in a plane, there is a possibility that a blank region (non-irradiated region) is generated at a specific part in the irradiated plane when the above-mentioned Expression (3) is not satisfied. This means that, as illustrated in FIG. 7 for example, the non-irradiated region or illuminance unevenness may be generated in an irradiated region in which the light emitted from the fly-eye lens 17 is irradiated. In this example, a non-irradiated region 211 is partially generated in addition to an irradiated region 210 on the reflection-type liquid crystal device 21, generating the illuminance unevenness. Specifically, the periodic non-irradiated region on the fly-eye lens 17 has caused the generation of the non-irradiated region 211 partially on the reflection-type liquid crystal device 21, where a solid line shown in FIG. 7 represents a light ray which passes through the non-irradiated region on the fly-eye lens 17. In contrast, performing the setting to satisfy the Expression (3) makes it possible to avoided the illuminance unevenness (unevenness in display) caused by the generation of the non-irradiated region 211.

As described above, in the present embodiment, the relative position between the prism array 14 through which the laser light passes and the fly-eye lens 17 that outputs the illumination light is displaced to vary at least one of the incidence position and the incidence angle, in the incidence surface of the fly-eye lens 17, of the laser light. This makes it possible to reduce the generation of the interference pattern (the speckle noise) caused by the laser light, while reducing or avoiding the light loss at the time when the light enters the fly-eye lens 17 from the prism array 14. Therefore, it is possible to reduce the generation of the interference pattern (to improve image quality), while achieving downsizing and enhancing light use efficiency.

Modification Examples

Now, modification examples (modification examples 1 to 8) of the above-mentioned embodiment will be described. It is to be noted that, the same reference numerals are given to the same components as those of the embodiment, and description thereof is appropriately omitted.

Modification Example 1

Figure 8:
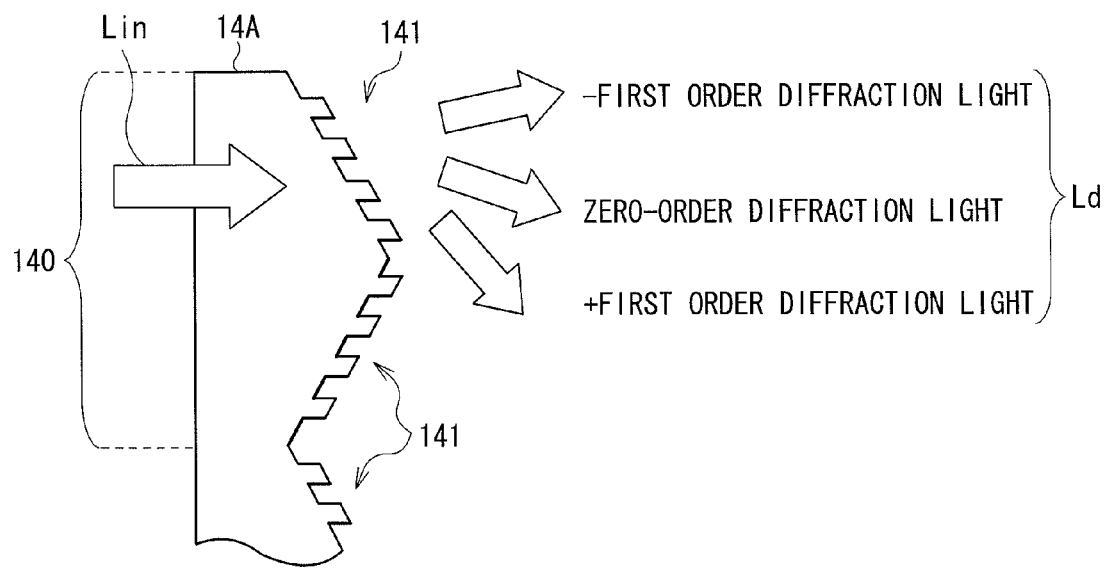
FIG. 8 is a cross-sectional view schematically illustrating a configuration of a prism array according to modification example 1.

FIG. 8 is a cross-sectional view schematically illustrating a configuration of an optical device (prism array 14A) according to modification example 1. The prism array 14A of the present modification example is provided with, in the prism array 14 of the above-mentioned embodiment, a diffraction grating 141 (diffraction grating structure) on the inclined surfaces of each of the prisms 140, and other configurations thereof are similar to those of the prism array of the embodiment.

The diffraction grating 141 diffracts incidence light Lin incident on the inclined surface of the prism 140 to thereby generate diffraction light Ld (e.g., zero-order diffraction light, +first order diffraction light, −first order diffraction light, and the like illustrated in the figure), and outputs the diffraction light.

In the present modification example that uses the prism array 14A having the diffraction grating 141, it is possible to avoid the illuminance unevenness (unevenness in display) caused by the generation of the non-irradiated region without performing the setting to satisfy the above-mentioned expression (3). That is, it is possible to avoid the illuminance unevenness (unevenness in display) caused by the generation of the non-irradiated region, without so setting the length Pa of the prism 140 and the pitch Pf of the fly-eye lens 17 as to satisfy the Expression (3) mentioned above.

Modification Example 2

Figure 9:
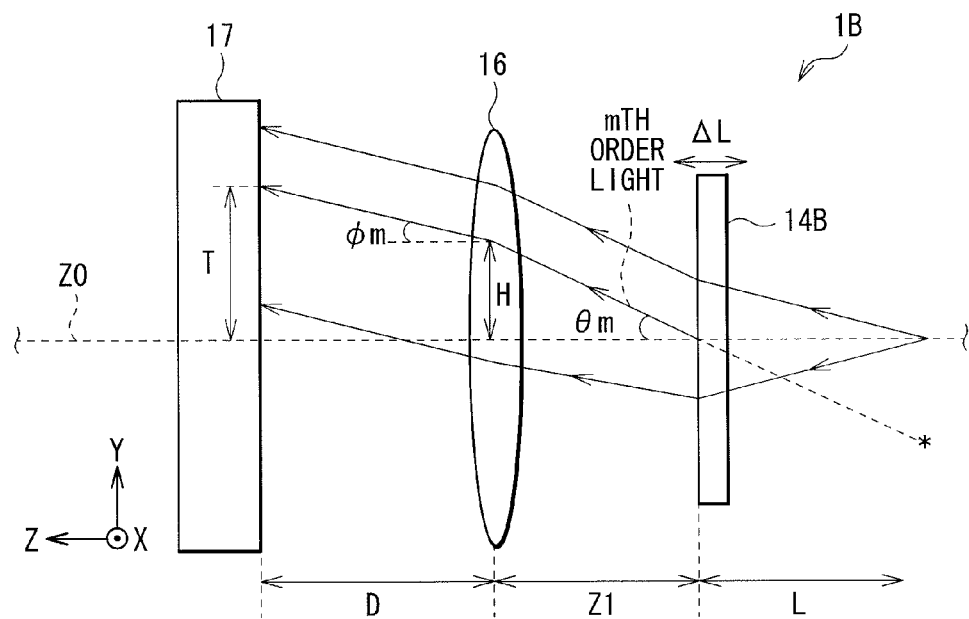
FIG. 9 illustrates a configuration of a major part of an illumination device according to modification example 2.

FIG. 9 illustrates a configuration of a major part of (or a part of) an illumination device (illumination device 1B) according to modification example 2. The illumination device 1B of the present modification example is provided, in place of the prism array 14 described in the above-mentioned embodiment, with a diffraction device 14B described below as a specific example of "optical device" of the disclosure, and other configurations thereof are similar to those of the illumination device 1.

The diffraction device 14B is an optical device which diffracts the incidence light to output the diffraction light to the collimator lens 16 and the fly-eye lens 17, as shown in the figure.

In this modification, the driving section 15 displaces the relative position between the diffraction device 14B and the fly-eye lens 17 to thereby vary at least one of the incidence position and the incidence angle of the laser light in the incidence surface of the fly-eye lens 17. More specifically, the driving section 15 oscillates (minutely oscillates) the diffraction device 14B along a direction (Z axis direction) of an optical axis (optical axis Z0) of the diffraction device 14B and the fly-eye lens 17 to thereby displace the relative position mentioned above.

Thus, with the diffraction effect of the incidence light (emission of the diffraction light) performed by the virtue of the diffraction device 14B and the oscillating operation performed by the driving section 15 in an optical axis direction of the diffraction device 14B, a beam scanning similar to that of the above-mentioned embodiment is performed. That is, a beam scanning by the incidence light incident from the diffraction device 14B is performed on the incidence surface of the fly-eye lens 17. As a result, as in the case of the above-mentioned embodiment, the generation of the speckle noise (the interference pattern) caused by the laser light is reduced by the multiplexing (the time averaging) of the speckle pattern.

In addition, also in the present modification example, the driving section 15 displaces (oscillates) the relative position between the diffraction device 14B and the fly-eye lens 17 (in this case, the diffraction device 14B itself) such that at least one of the incidence position and the incidence angle of the laser light is varied in the incidence surface of the fly-eye lens 17. Therefore, also in the present modification example, light loss at the time when the light enters the fly-eye lens 17 from the prism array 14B is reduced or avoided even when the displacement of the relative position (the beam scanning) described above is performed, as in the case of the embodiment described above.

Here, as for mth order light (mth order diffraction light) of the diffraction light from the diffraction device 14B, H and T are heights (distances in Y axis direction) from the optical axis Z0 at the positions of the collimator lens 16 and the fly-eye lens 17, respectively, as illustrated in FIG. 9. Further, the following Expression (4) is satisfied, where a diffraction angle of the mth order light is $\theta_m$, a distance between the diffraction device 14B and the collimator lens 16 is Z1, a distance between the collimator lens 16 and the fly-eye lens 17 is D, and a combined focal distance of the collimator lens 16 is f (not shown). Thereby, an amount of change $\Delta T$ of the height T on the fly-eye lens 17 can be expressed by the following Expression (5), where amplitude at the time of the oscillation of the diffraction device 14B is $\Delta L$. Therefore, in the present modification example, it is only necessary to set the amplitude $\Delta L$ at the time of the oscillation such that the amount of change $\Delta T$ is within a range within which the speckle noise is effectively reduced. Moreover, the above-mentioned diffraction angle $\theta_m$ is expressed by the following Expression (6), where a pitch of the diffraction grating of the diffraction device 14B is p and a wavelength of the incidence light is $\lambda$. Therefore, in the present modification example, when defining that a beam shift amount effective in reducing the speckle on the fly-eye lens 17 is S, the following Conditional Expressions are satisfied for the beam shift amount S.

[Numeric Expression 1]

$$\begin{cases} T = \left(Z + D \times \dfrac{L}{f}\right)\tan\theta_m & (4) \\ \Delta T = \left(D \times \dfrac{\tan\theta_m}{f}\right)\Delta L & (5) \\ \theta_m = \sin^{-1}\left(\dfrac{m\lambda}{p}\right) & (6) \\ D \times \dfrac{\tan\theta_m}{f}\Delta L \geq S & (7) \end{cases}$$

Also in the illumination device 1B configured as above and a display apparatus using the same, it is possible to achieve an effect similar to that of the above-mentioned embodiment through a function similar to that of the above-mentioned embodiment. Namely, it is possible to reduce the generation of the interference pattern (possible to improve image quality), while achieving downsizing and enhancing light use efficiency.

Modification Example 3

Figure 10:
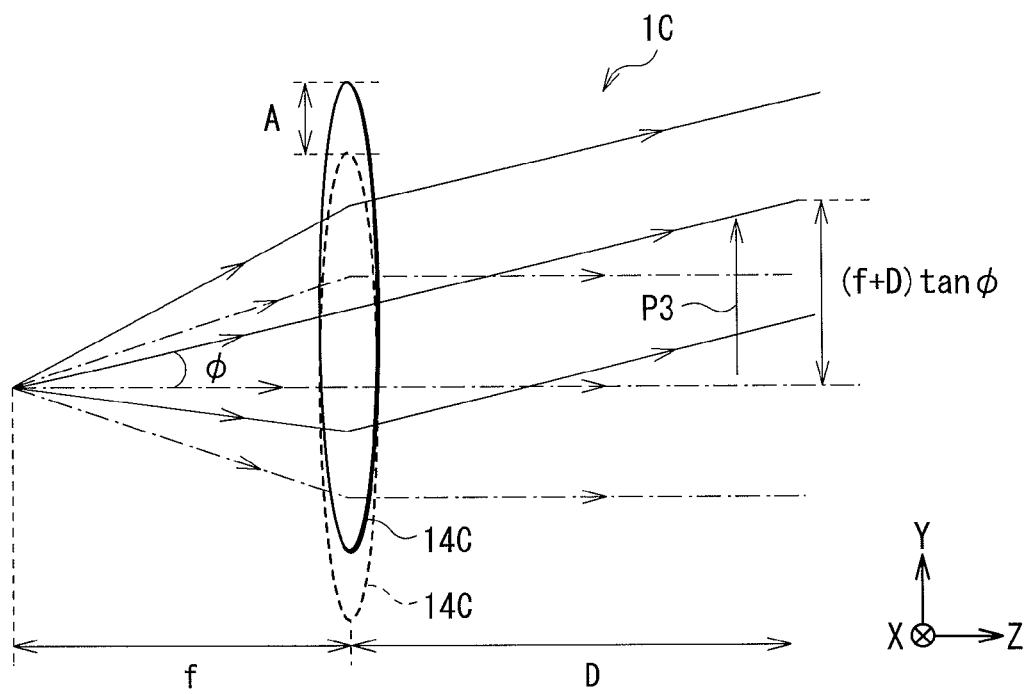
FIG. 10 illustrates a configuration of a major part of an illumination device according to modification example 3.

FIG. 10 illustrates a configuration of a major part (or a part) of an illumination device (illumination device 1C) according to modification example 3. The illumination device 1C of the present modification example is provided, in place of the prism array 14 described in the above-mentioned embodiment, with a lens (collimator lens 14C) described below as a specific example of "optical device" of the disclosure, and other configurations thereof are similar to those of the illumination device 1.

The collimator lens 14C collimates the emission light emitted from the dichroic prism 132 into parallel light, and is an NA converting lens having a positive power.

In the present modification example, the driving section 15 displaces the relative position between the collimator lens 14C and the fly-eye lens 17 to thereby vary at least one of the incidence position and the incidence angle of the laser light in the incidence surface of the fly-eye lens 17. More specifically, the driving section 15 oscillates (minutely oscillates) the collimator lens 14C along an in-plane direction (a direction in an X-Y plane) orthogonal to an optical axis (optical axis Z0) of the collimator lens 14C and the fly-eye lens 17, to thereby displace the relative position mentioned above.

Thus, with the function of collimating the incidence light by the collimator lens 14C and the oscillating operation (decentering function) performed by the driving section 15 in the in-plane direction orthogonal to the optical axis direction of the collimator lens 14C, a beam scanning similar to that of the above-mentioned embodiment is performed. That is, a beam scanning by the incidence light incident from the collimator lens 14C is performed on the incidence surface of the fly-eye lens 17 (see arrow P3 shown in FIG. 10). As a result, as in the case of the above-mentioned embodiment, the generation of the speckle noise (the interference pattern) caused by the laser light is reduced by the multiplexing (the time averaging) of the speckle pattern.

In addition, also in the present modification example, the driving section 15 displaces (oscillates) the relative position between the collimator lens 14C and the fly-eye lens 17 (in this case, the collimator lens 14C itself) so as to vary at least one of the incidence position and the incidence angle of the laser light in the incidence surface of the fly-eye lens 17. Therefore, also in the present modification example, light loss at the time when the light enters the fly-eye lens 17 from the collimator lens 14C is reduced or avoided even when the displacement of the relative position (the beam scanning) described above is performed, as in the case of the embodiment described above.

Here, the following Expression (8) is satisfied, where decentering in the collimator lens 14C is A, an emission angle of the emission light emitted from the collimator lens 14C in the case where the decentering A is given is $\phi$, and a focal distance of the collimator lens 14C is f, as illustrated in FIG. 10. In addition, in the present modification example, the following Expression (9) is satisfied for the beam shift amount S effective in reducing the speckle on the fly-eye lens 17, where a distance between the collimator lens 14C and the fly-eye lens 17 is D. Therefore, in the present modification example, the following Conditional Expressions (the Expression (10)) are satisfied for the above-mentioned beam shift amount S by the Expressions (8) and (9)

[Numeric Expression 2]

$$\begin{cases} A = f \tan\phi & (8) \\ (f + D)\tan\phi \geq S & (9) \\ \left(A + D \times \dfrac{A}{f}\right) \geq S & (10) \end{cases}$$

Also in the illumination device 1C configured as above and a display apparatus using the same, it is possible to achieve an effect similar to that of the above-mentioned embodiment through a function similar to that of the above-mentioned embodiment. Namely, it is possible to reduce the generation of the interference pattern (possible to improve image quality), while achieving downsizing and enhancing light use efficiency.

It is to be noted that, in the present modification example, description has been made taking the collimator lens 14C as an example of a lens that serves as "optical device". However, this is not limitative, and other lenses may be used. Specifically, it is only necessary to establish a positive power in an optical system as a whole, and the optical system may be established with use of a plurality of lenses including an NA converting lens having a negative power.

Modification Example 4

Configuration of Optical Device 14D

Figure 11:
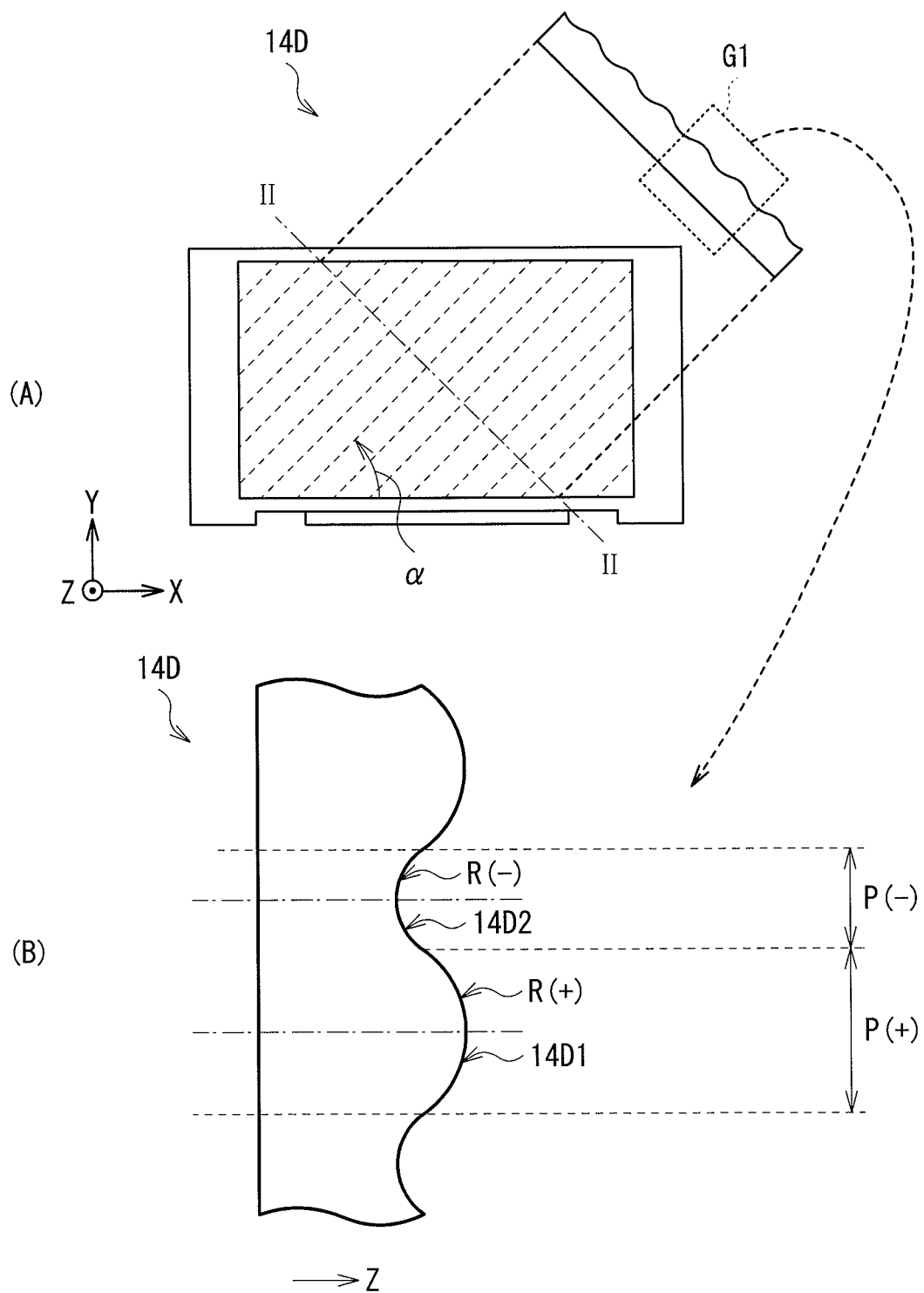
FIG. 11 schematically illustrates a configuration of an optical device according to modification example 4.

FIG. 11 schematically illustrates a configuration of an optical device (an optical device 14D) according to modification example 4. The optical device 14D of the present modification example has, on a light emission surface side thereof, a concave-convex surface configured by a periodic corrugated structure. Here, (A) of FIG. 11 illustrates a plan configuration in an X-Y plane and a cross-sectional configuration, taken along a line II-II in the drawing, of the optical device 14D. (B) of FIG. 11 corresponds to an enlarged view of the portion denoted by a symbol G1 in (A) of FIG. 11.

As illustrated in (B) of FIG. 11, the optical device 14D has, on the light emission surface side thereof, a configuration in which a first optical surface 14D1 configured of a convex-shaped curved surface and a second optical surface 14D2 configured of a concave-shaped curved surface are alternately arranged (one-dimensional arrangement). It is to be noted that, here, a pitch of the first optical surface 14D1 is denoted as P(+), a curvature radius of the first optical surface 14D1 is denoted as P(+), a pitch of the second optical surface 14D2 is denoted as P(−), and a curvature radius of the second optical surface 14D2 is denoted as P(−).

Each of the first optical surface 14D1 and the second optical surface 14D2 is disposed to be inclined relative to the X axis and the Y axis (relative to an arrangement direction of the unit lenses 170 in the fly-eye lens 17 described later). In other words, an extending direction of the first and the second optical surfaces 14D1 and 14D2 and the arrangement direction of the unit lenses 170 described above are inclined with respect to each other. As one example, here, an inclination angle α between the extending direction of the first and the second optical surfaces 14D1 and 14D2 and the x axis equals to 45 degrees.

Figure 12:
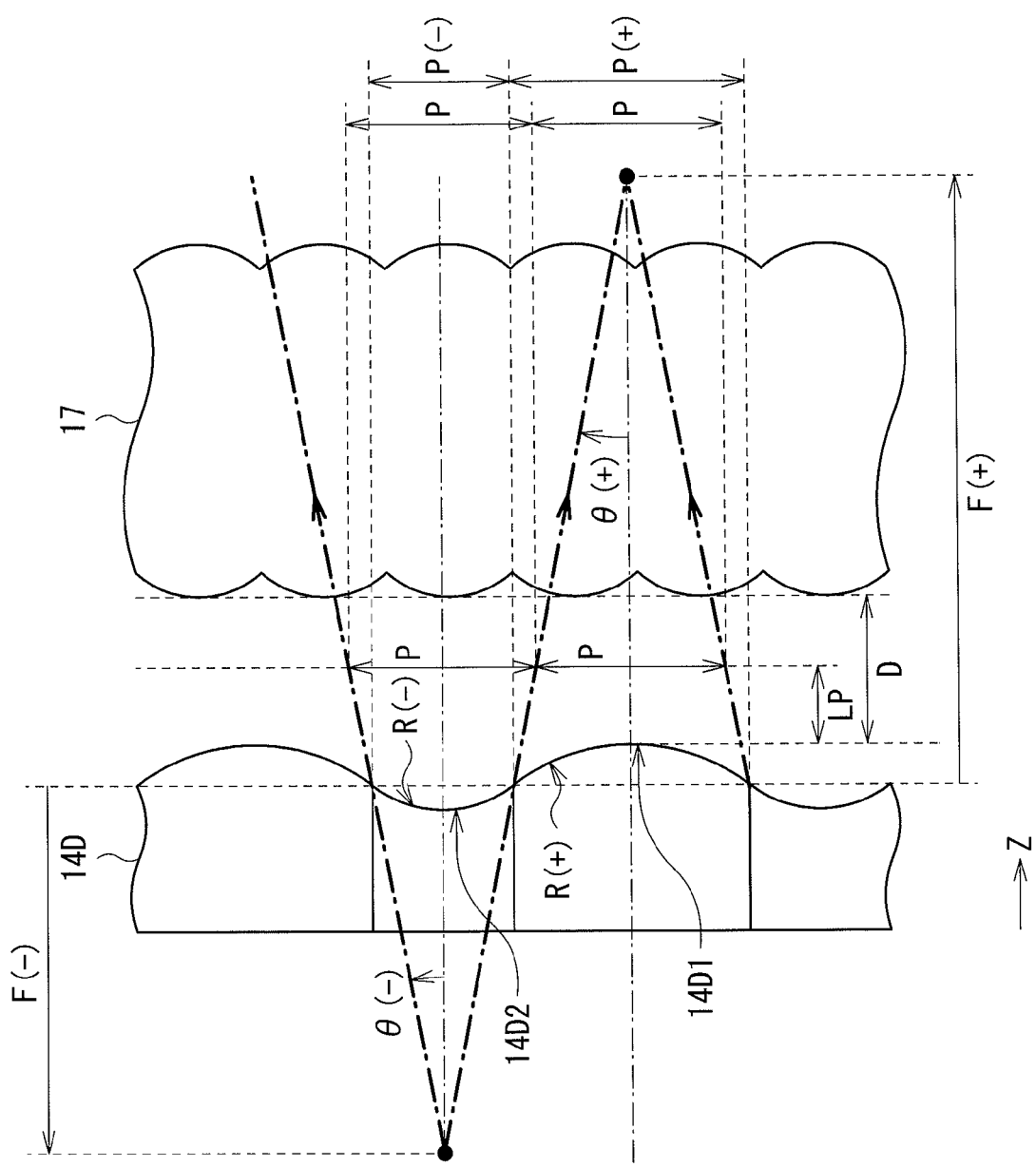
FIG. 12 is a schematic view illustrating a specific configuration of the optical device illustrated in FIG. 11.

Here, as illustrated schematically in FIG. 12, the first optical surface 14D1 has a function of outputting the incident laser light while converging the same, whereas the second optical surface 14D2 has a function of outputting the incident laser light while diffusing the same, for example. In addition, in the optical device 14D, the first optical surface 14D1 and the second optical surface 14D2 are so connected smoothly as to allow a light path of convergent light outputted from the first optical surface 14D1 and a light path of divergent light outputted from the second optical surface 14D2 to vary continuously (densely and sparsely). It is to be noted that F(+) illustrated in FIG. 12 denotes a focal distance in the first optical surface 14D1, and F(−) denotes a focal distance in the second optical surface 14D2.

Also, when defining that a maximum value in an angle formed by a direction of travel of the emission light from the optical device 14D and the optical axis (here, the Z axis) of the fly-eye lens 17 (an angle θ(+) formed by the convergent light and an angle θ(−) formed by the divergent light) is θ max and that an allowable incidence angle in the fly-eye lens 17 is θth as illustrated in FIG. 12, the optical device 14D is so set as to satisfy a conditional expression: θ max≤θth.

Incidentally, various parameters of the optical device 14D are set to values illustrated in FIG. 13, for example. Here, LP denotes a distance between a plane, where a light flux width of the convergent light outputted from the first optical surface 14D1 and a light flux width of the divergent light outputted from the second optical surface 14D2 become equal to each other (where, in each of which, the pitch p is established), and the optical device 14D, as illustrated in FIG. 12.

(Function and Effect of Optical Device 14D)

Figure 14:
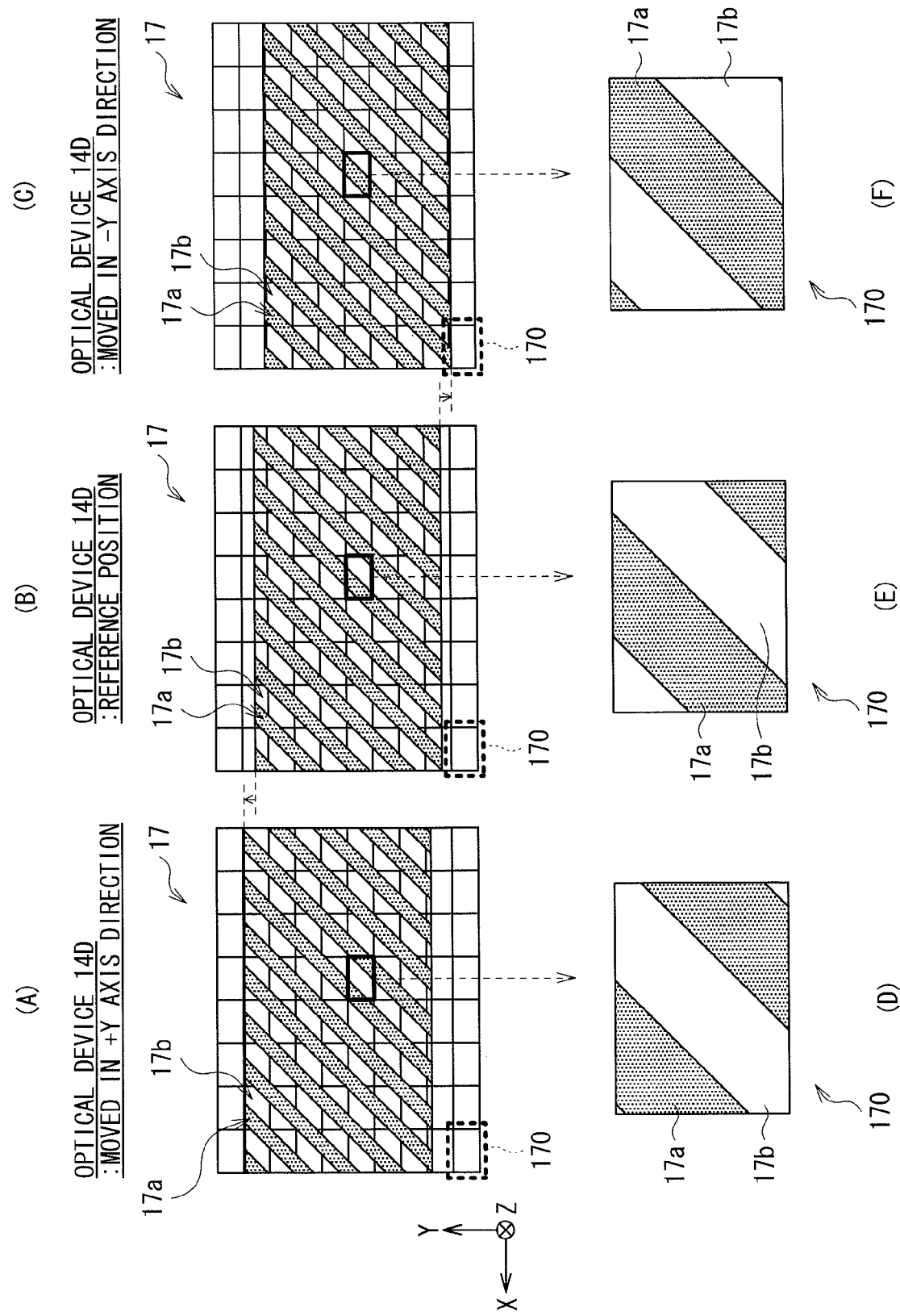
FIG. 14 is a schematic view for describing a function of the optical device illustrated in FIG. 11.

As illustrated, for example, in (A) to (C) of FIG. 14, the optical device 14D having such configuration is so driven that the relative position between the optical device and the fly-eye lens 17 is displaced in each of a +Y axis direction and a −Y axis direction from a reference position, thereby achieving a function and an effect as follows. It is to be noted that (A) to (C) of FIG. 14 each schematically illustrate a convergent light flux region 17a and a diffusion light flux region 17b on the above-described plane separated away by the distance LP from the optical device 14D, which are overlapped with the respective unit lenses 170 in the fly-eye lens 17. Also, (D) to (F) of FIG. 14 each schematically illustrate the convergent light flux regions 17a and the diffusion light flux regions 17b in an area on the unit lens 170 illustrated by a heavy line in each of (A) to (C) of FIG. 14.

More specifically, the optical device 14D is so driven as to oscillate in the Y axis. Thereby, switching between the convergent light flux region 17a and the diffusion light flux region 17b is performed alternately in the area on each of the unit lenses 170 as illustrated in (D) to (F) of FIG. 14, for example. Hence, also in an illumination device and a display apparatus that use the optical device 14D configured as above, it is possible to achieve an effect similar to that of the above-mentioned embodiment etc. through a function similar to that of the above-mentioned embodiment etc. Namely, it is possible to reduce the generation of the interference pattern (possible to improve image quality), while achieving downsizing and enhancing light use efficiency.

Also, in the present modification example, the extending direction of the first and the second optical surfaces 14D1 and 14D2 and the arrangement direction of the unit lenses 170 in the fly-eye lens 17 are inclined with respect to each other, making it possible to achieve an effect described below as well. Namely, it is also possible to reduce a crosstalk of a boundary region between the unit lenses 170 to a connection boundary line between the convergent light flux and the diffusion light flux.

It is to be noted that, although a case has been described in which the corrugated structure is formed on the light emission surface side of the optical device 14D in the present modification example, the corrugated structure may be formed on the light incidence surface side thereof, or may be formed on both the light incidence surface side and the light emission surface side.

Modification Example 5

Figure 15:
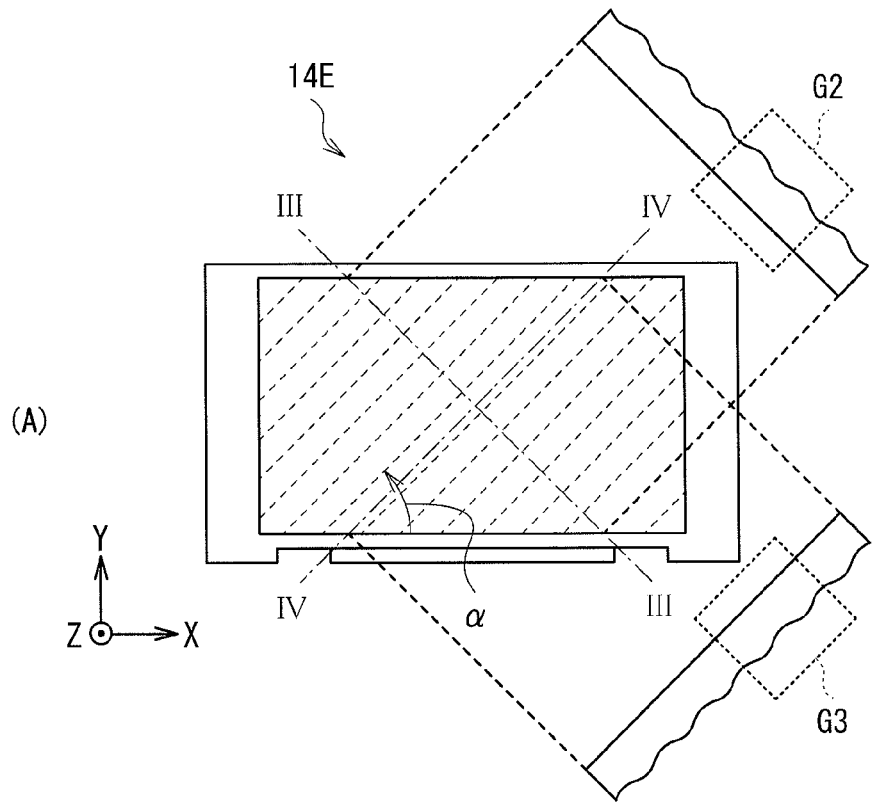
FIG. 15 schematically illustrates a configuration of an optical device according to modification example 5.
Figure 15:
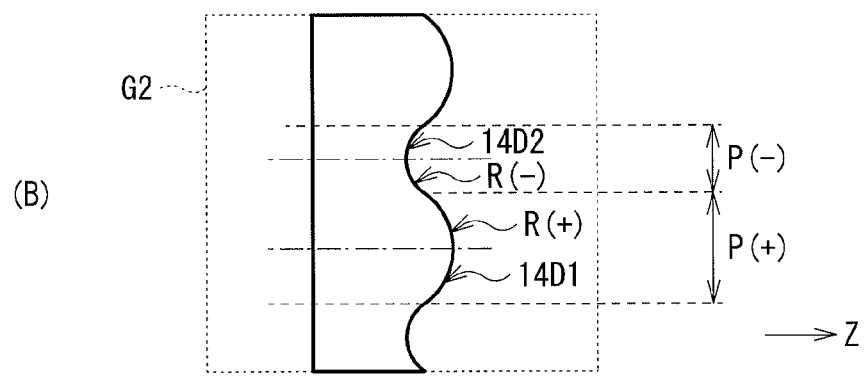
Figure 15:
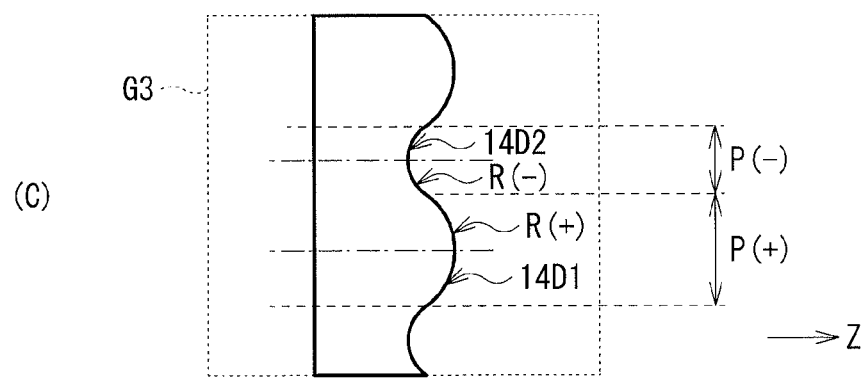

FIG. 15 schematically illustrates a configuration of an optical device (an optical device 14E) according to modification example 5. The optical device 14E of the present modification example has, on a light emission surface side thereof, a concave-convex surface configured by a periodic corrugated structure. Here, (A) of FIG. 15 illustrates a plan configuration in an X-Y plane and cross-sectional configurations, taken along respective lines III-III and IV-IV in the drawing, of the optical device 14E. (B) and (C) of FIG. 15 correspond to respective enlarged views of the portions denoted by symbols G2 and G3 in (A) of FIG. 15.

The optical device 14E has, on the light emission surface side thereof, a configuration in which the first optical surface 14D1 configured of the convex-shaped curved surface and the second optical surface 14D2 configured of the concave-shaped curved surface are alternately arranged (two-dimensional arrangement). In other words, in each of the enlarged views (enlarged cross-sectional views) of the portions denoted by the symbols G2 and G3 in (B) and (C) of FIG. 15, there is provided a configuration similar to that described in the modification example 4 mentioned above. It is to be noted that, as in the optical device 14D, the extending direction of the first and the second optical surfaces 14D1 and 14D2 and the arrangement direction of the unit lenses 170 are inclined with respect to each other in the optical device 14E as well (for example, the inclination angle α equals to 45 degrees).

Also in an illumination device and a display apparatus that use the optical device 14E configured as above, it is possible to achieve an effect similar to that of the above-mentioned embodiment etc. through a function similar to that of the above-mentioned embodiment etc. It is to be noted that, in the optical device 14E of the present modification example as well, the corrugated structure may be formed on the light incidence surface side thereof, or may be formed on both the light incidence surface side and the light emission surface side.

Modification Example 6

Figure 16:
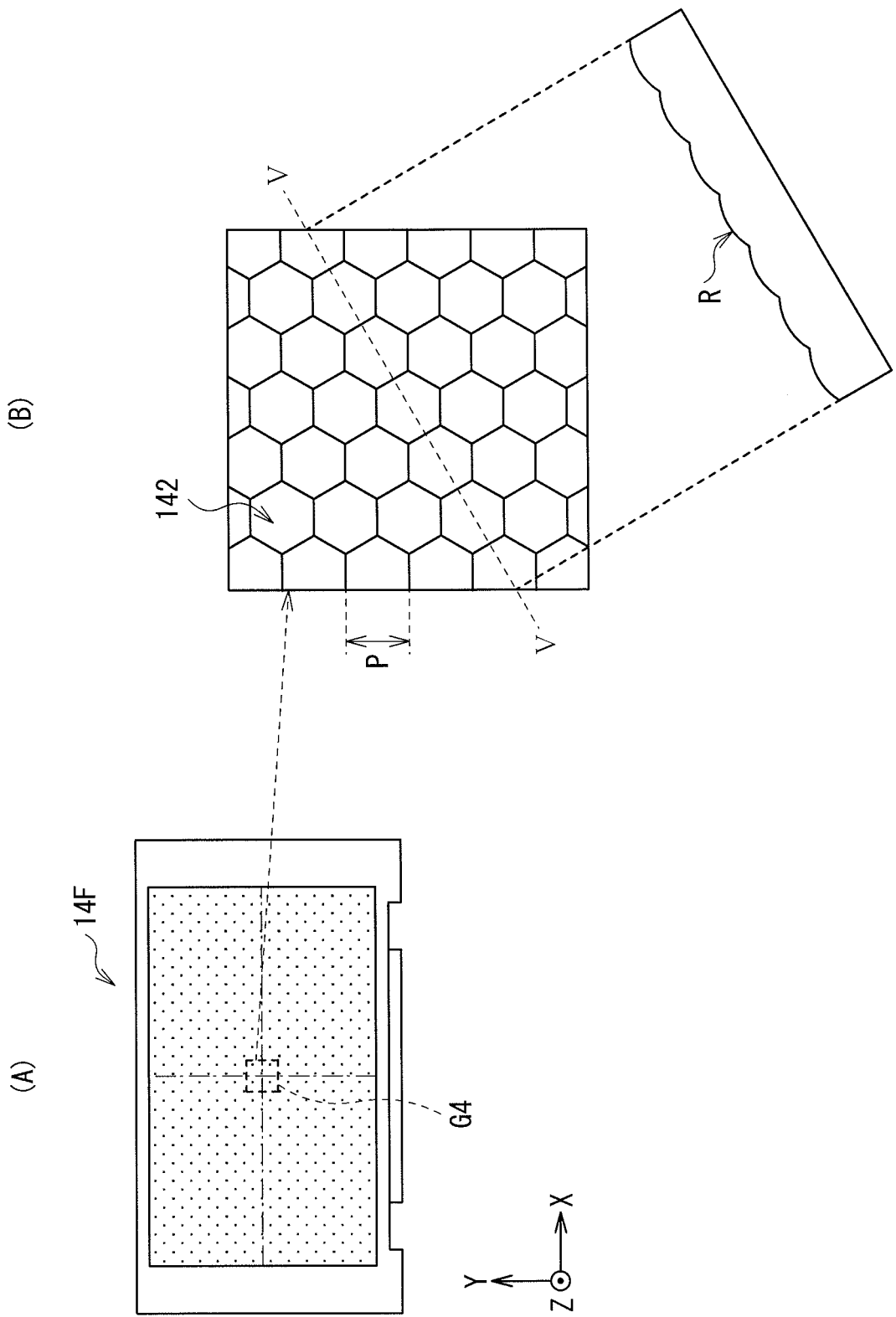
FIG. 16 schematically illustrates a configuration of an optical device according to modification example 6.

FIG. 16 schematically illustrates a configuration of an optical device (an optical device 14F) according to modification example 6. The optical device 14F of the present modification example has, on a light emission surface side thereof, a configuration in which a plurality of microlenses 142 are two-dimensionally arranged (where a pitch and a curvature radius of each of the microlenses 142 are P and R, respectively). In other words, the optical device 14F is configured by a microlens array. It is to be noted that FIG. 16 illustrates a plan configuration in an X-Y plane and a cross-sectional configuration, taken along a line V-V in the drawing, of the optical device 14F.

Also in an illumination device and a display apparatus that use the optical device 14F configured as above, it is possible to achieve an effect similar to that of the above-mentioned embodiment etc. through a function similar to that of the above-mentioned embodiment etc. It is to be noted that, in the optical device 14F of the present modification example as well, the plurality of microlenses 142 may be formed on the light incidence surface side thereof, or may be formed on both the light incidence surface side and the light emission surface side.

Modification Example 7

Figure 17:
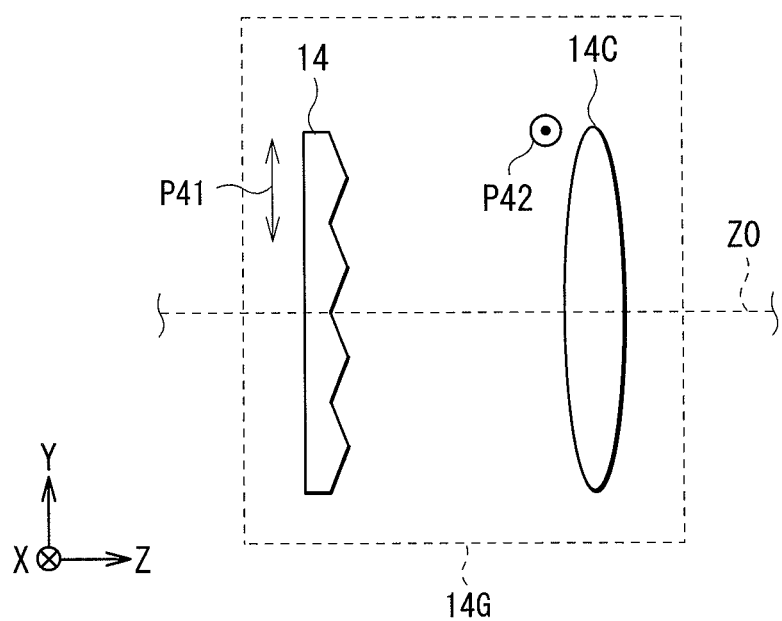
FIG. 17 illustrates a configuration of a major part of an illumination device according to modification example 7.

FIG. 17 illustrates a configuration of a major part (a part) of an illumination device according to modification example 7. The illumination device of the present modification example includes a plurality of optical devices as a specific example of "optical device" of the disclosure, and other configurations thereof are similar to those of the illumination device 1.

The optical device group 14G is an optical system including a plurality of optical devices that are arranged along an optical axis Z0 thereof, and in this case, the prism array 14 and the collimator lens 14C described above are arranged along the optical axis Z0. However, a combination of the plurality of optical devices is not limited thereto, and other combinations may be adopted. Specifically, for example, a combination of the prism array 14 and a lens (collimator lens 14C), a combination of the prism array 14 and the diffraction device 14B, a combination of the prism array 14 and the fly-eye lens, a combination of the diffraction device 14B and a lens (collimator lens 14C), a combination of the diffraction device 14B and the fly-eye lens, a combination of a lens (collimator lens 14C) and the fly-eye lens, and so forth may be adopted. Also, among the plurality of optical devices that also include the optical devices 14D, 14E, and 14F described in the modification examples 4 to 6 above in addition to the optical devices (the prism array 14, the diffraction device 14B, the collimator lens 14C, and the fly-eye lens), two or more optical devices may be used in optional combinations.

In the present modification example, the driving section 15 displaces the relative position between the plurality of optical devices of the optical device group 14G and the fly-eye lens 17 to thereby vary at least one of the incidence position and the incidence angle of the laser light in the incidence surface of the fly-eye lens 17. Specifically, the driving section 15 oscillates (minutely oscillates) each of the optical devices in the optical device group 14G in separate directions to thereby displace the relative position mentioned above. More specifically, in the example illustrated in FIG. 17, the driving section 15 oscillates the prism array 14 along the array direction (Y axis direction) of the prisms 140 in the plane orthogonal to the optical axis Z0, as shown by arrow P41. On the other hand, the driving section 15 oscillates the collimator lens 14C along an in-plane direction (a direction in an X-Y plane) orthogonal to the optical axis Z0, as shown by arrow P42.

Also in the illumination device configured as above and a display apparatus using the same, it is possible to achieve an effect similar to that of the above-mentioned embodiment etc. through a function similar to that of the above-mentioned embodiment etc. Namely, it is possible to reduce the generation of the interference pattern (possible to improve image quality), while achieving downsizing and enhancing light use efficiency.

Also, in the present modification example, the plurality of optical devices in the optical device group 14G are oscillated along separate directions (directions different from one another), thereby making it possible to further reduce the generation of the interference pattern.

Modification Example 8

Figure 18:
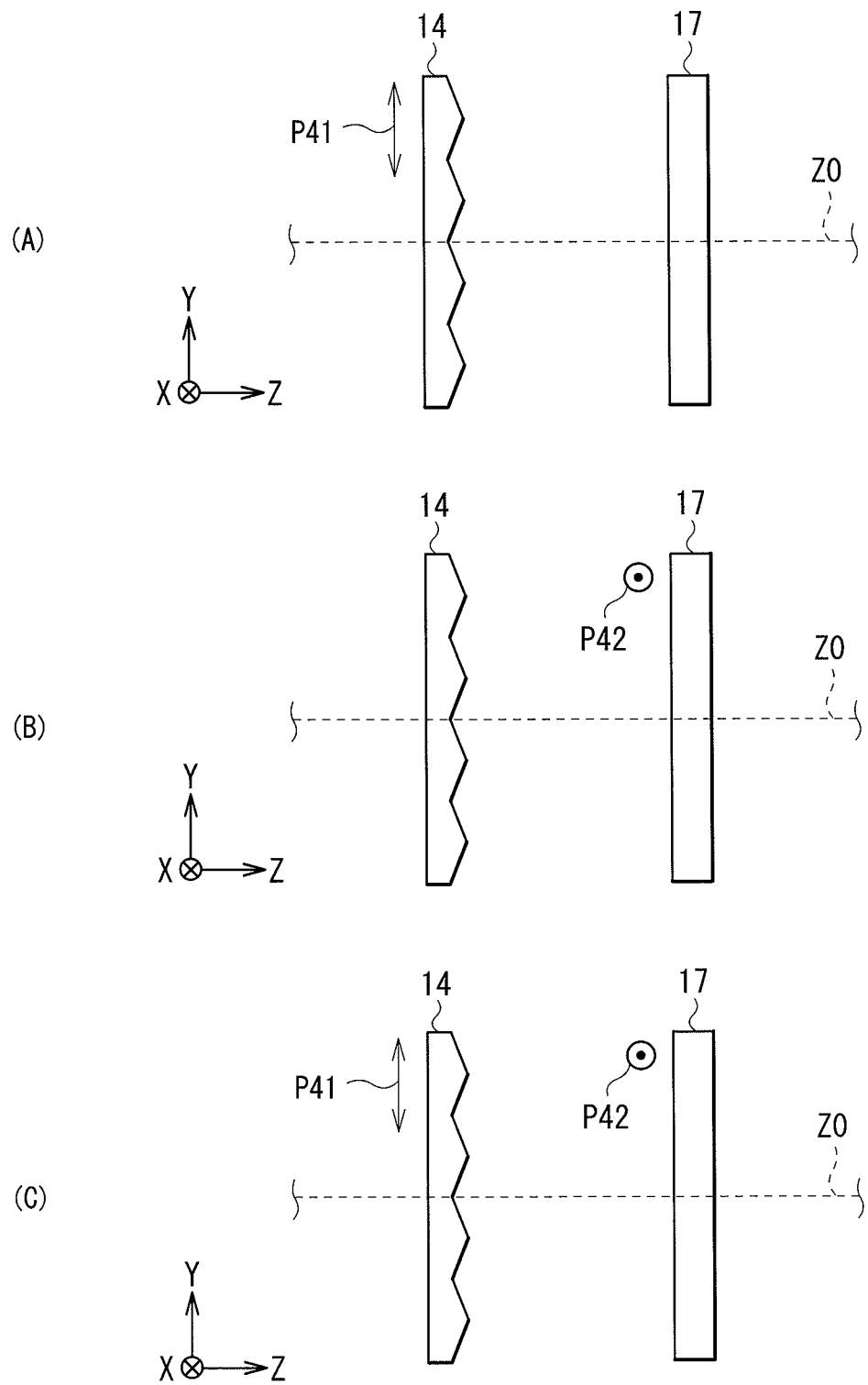
FIG. 18 illustrates a configuration of a major part of an illumination device according to modification example 8.

(B) and (C) of FIG. 18 each illustrate a configuration of a major part (or a part) of an illumination device according to modification example 8.

In the descriptions given so far, as illustrated in (A) of FIG. 18 for example, the driving section 15 oscillates only one (only the optical device) of an optical device (in this case, the prism array 14) and the fly-eye lens 17 to thereby displace the relative position therebetween.

However, in the present modification example, firstly, in the example illustrated in (B) of FIG. 18, the driving section 15 oscillates only the other (only the fly-eye lens 17) of the optical device (prism array 14) and the fly-eye lens 17 to thereby displace the relative position therebetween.

In addition, in the example illustrated in (C) of FIG. 18, the driving section 15 oscillates each of (both of) the optical device (prism array 14) and the fly-eye lens 17 to thereby displace the relative position therebetween.

As above, at least one of the optical device and the fly-eye lens 17 may be oscillated by the driving section 15 to thereby displace the relative position therebetween, making it possible to achieve an effect similar to that of the above-mentioned embodiment etc. through the function similar to that of the above-mentioned embodiment etc. Namely, it is possible to reduce the generation of the interference pattern (possible to improve image quality), while achieving downsizing and enhancing light use efficiency.

It is to be noted that, in the present modification example, description has been made taking the prism array 14 as an example of "optical device", although it is not limited thereto. The diffraction device 14B, the lens (collimator lens 14C), the optical devices 14D, 14E, and 14F, and so forth described above may be used.

Other Modification Examples

Hereinbefore, a technology of the disclosure is described with reference to the embodiment and modification examples, but the technology is not limited to the embodiment etc., and various modifications may be made.

For example, in the embodiment etc., the description has been made taking the prism array, the diffraction device, the lens (collimator lens), the microlenses, and so forth as examples of "optical device" of the disclosure. However, optical devices other than those may be used. Namely, other optical devices that have a configuration in which a plurality of unit structures are arranged one-dimensionally or two-dimensionally, or other optical devices that split a light path of incident laser light into periodic light paths and outputs that laser light may be used, for example. Likewise, as "optical member" of the disclosure, optical members other than the fly-eye lens described in the embodiment etc. mentioned above (such as a rod integrator) may be used.

Figure 19:
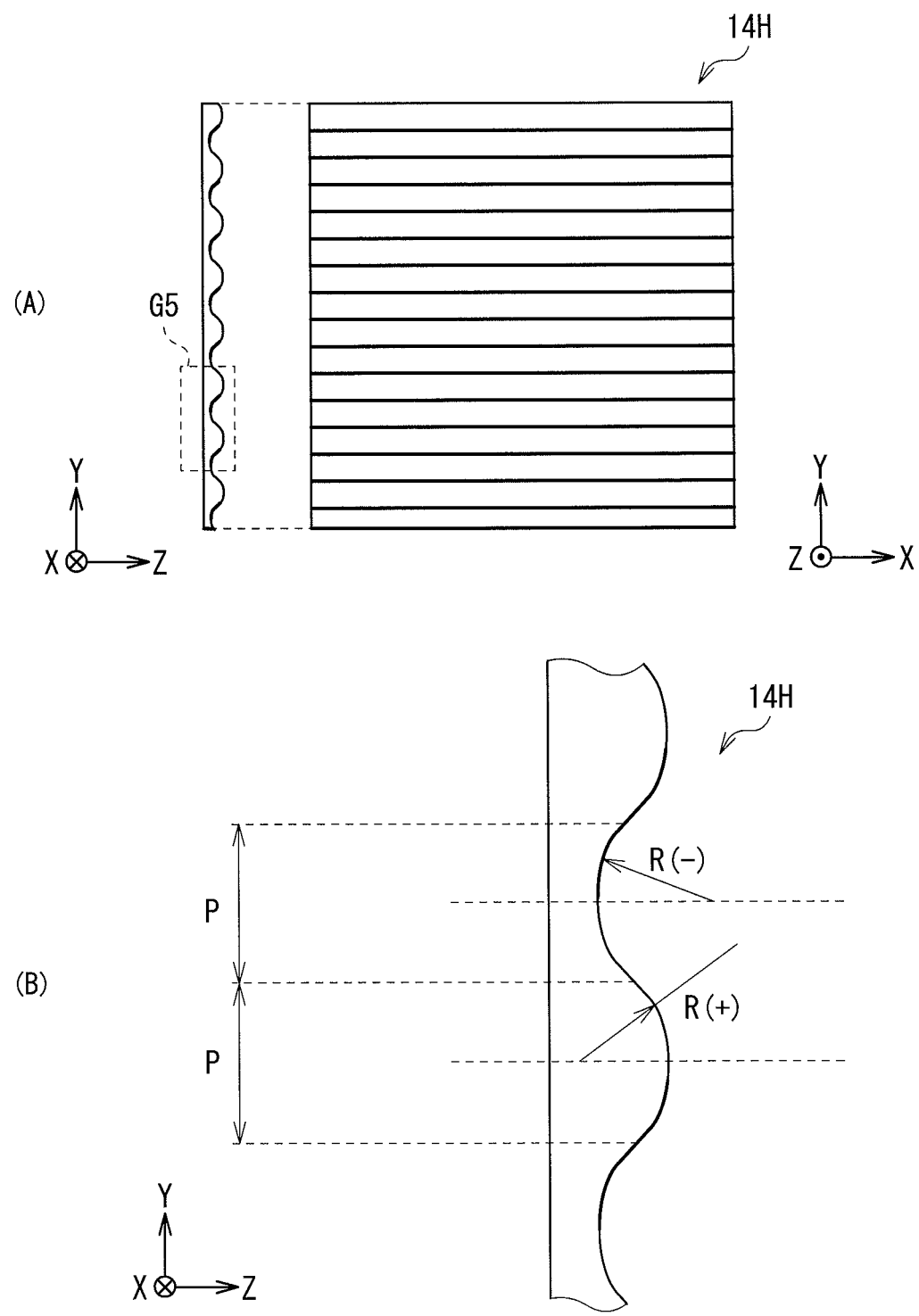
FIG. 19 schematically illustrates a configuration of an optical device according to another modification example.
Figure 20:
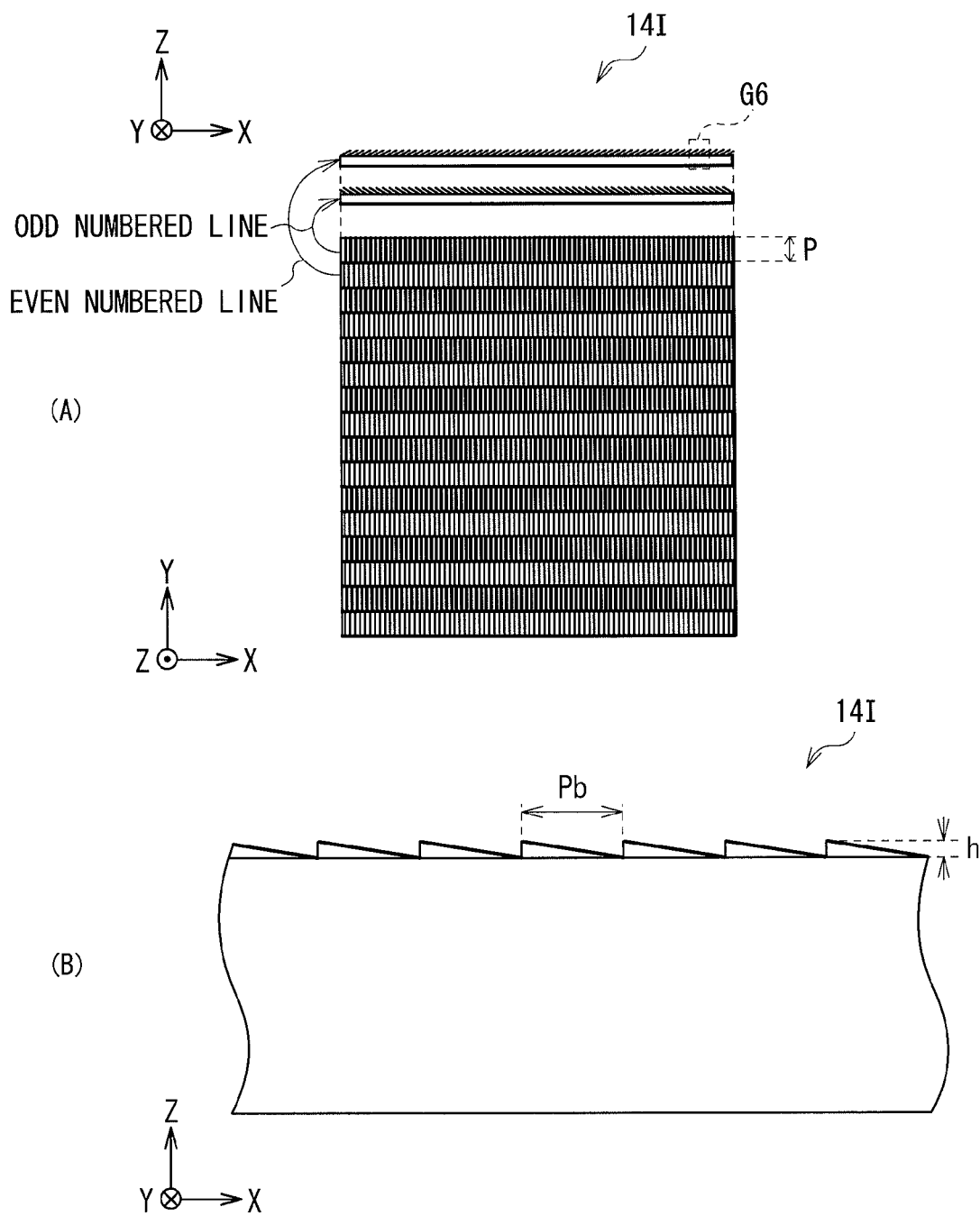
FIG. 20 schematically illustrates a configuration of an optical device according to another modification example.
Figure 21:
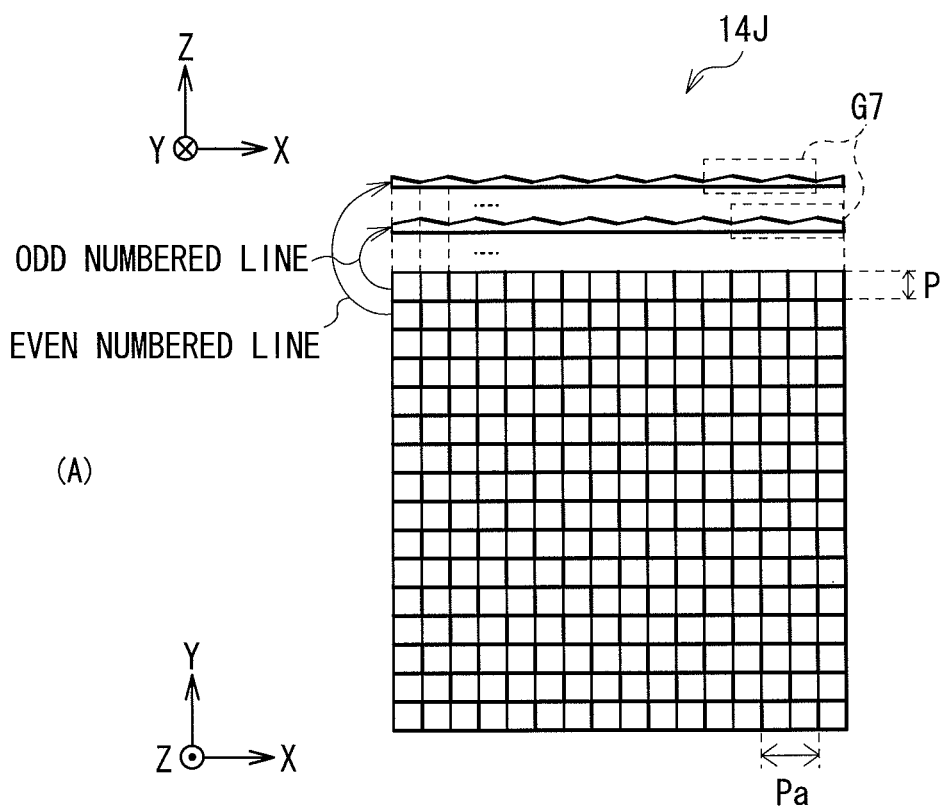
FIG. 21 schematically illustrates a configuration of an optical device according to another modification example.
Figure 21:
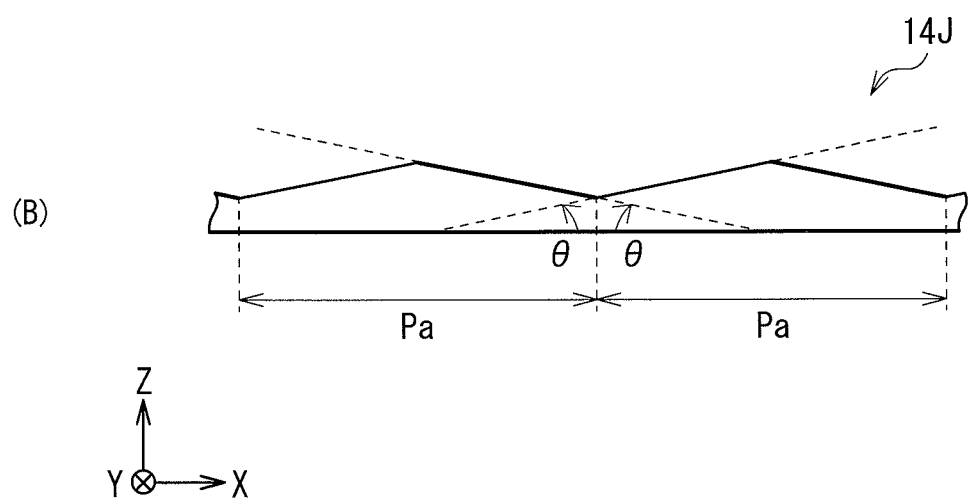

Specifically, an optical device 14H illustrated in FIG. 19 has, on the light emission surface side thereof, a concave-convex surface having a periodic corrugated structure (pitch: P, curvature radius: R(+), R(−)), for example. It is to be noted that (A) of FIG. 19 illustrates a cross-sectional configuration of the optical device 14H taken along a Y-Z plane and a plan configuration in an X-Y plane, and (B) of FIG. 19 corresponds to an enlarged view of the portion denoted by the symbol G5 in (A) of FIG. 19. Also, an optical device 14I illustrated in FIG. 20 has, on the light emission surface side thereof, a periodic diffraction structure (blaze structure, pitch: Pb, height: h) extending along the X axis direction, for example. This periodic diffraction structure is formed to have inclined surfaces that are oriented in opposite directions to each other along the X axis direction between an odd-numbered line and an even-numbered line (pitch between each line: P) which are in the Y axis direction. It is to be noted that (A) of FIG. 20 illustrates a cross-sectional configuration of the optical device 14I taken along the Y-Z plane (odd numbered line and even numbered line) and a plan configuration in the X-Y plane, and (B) of FIG. 20 corresponds to an enlarged view of the portion denoted by the symbol G6 in (A) of FIG. 20. Further, an optical device 14J illustrated in FIG. 21 has, on the light emission surface side thereof, a concave-convex structure configured of a periodic inclined surface structure (pitch: Pa, inclination angle: θ) extending along the X axis direction, for example. This periodic concave-convex structure is formed such that a concave portion (depression) and a convex portion (protrusion) are alternately positioned between an odd-numbered line and an even-numbered line (pitch between each line: P) which are in the Y axis direction. It is to be noted that (A) of FIG. 21 illustrates a cross-sectional configuration of the optical device 14J taken along the Y-Z plane (odd numbered line and even numbered line) and a plan configuration in the X-Y plane, and (B) of FIG. 21 corresponds to an enlarged view of the portion denoted by the symbol G7 in (A) of FIG. 21. Also with the optical devices 14H, 14I, and 14J having such configurations, it is possible to achieve an effect similar to that of the above-mentioned embodiment etc. through the function similar to those of the above-mentioned embodiment etc. It is to be noted that, although the optical devices 14H, 14I, and 14J have the corrugated structure, the diffraction structure, and the concave-convex structure, respectively, on the light emission surface side thereof, these structures may be formed on the light incidence surface side thereof, or may be formed on both the light incidence surface side and the light emission surface side.

In addition, although, in the above-mentioned embodiment etc., a case in which each of the plurality of kinds (for red color, for green color, for blue color) of light sources is the laser light source is described, it is not limited thereto. At least one of the plural kinds of light sources may be the laser light source. That is, a combination of a laser light source and other kind of light sources (such as LED, for example) may be provided in a light source section.

Further, although, in the above-described embodiment etc., a case in which the light modulation device is a liquid crystal device of a reflection-type is described, it is not limited thereto. The light modulation device may be, for example, a liquid crystal device of a transmission type, or may be other light modulation devices other than the liquid crystal device. Also, although the description has been made on the above-described embodiment etc. with reference to an example where the "optical device" in the disclosure is the transmission type optical device (the optical device through which the laser light passes), it is not limited thereto. For example, a reflection type optical device (an optical device that reflects the laser light) may be employed.

In addition, although, in the above-described embodiment etc., a case in which three kinds of light sources that emit light beams of different wavelengths are used is described, not only three kinds of light sources but also one kind of light source, two kinds of light sources, or four kinds or more light sources may be used, for example.

Further, although the above-described embodiment etc. are described with specific reference to the respective elements (optical systems) of the optical apparatus and the display apparatus, it is not necessary to have all of the elements, and other elements may be included. Specifically, a dichroic mirror may be provided in place of the dichroic prisms 131 and 132, for example.

Further, although, in the above-described embodiment etc., a case is described where the projection optical system (project lens), which projects the light modulated by the light modulation device onto a screen, is provided to configure the display apparatus as a display apparatus of a projection type, the technology may be applied such as to a display apparatus of a direct-view-type as well.

It is also possible for the technology to employ configurations such as those listed below.
(1) An illumination device, including:
a light source section including a laser light source;
an optical device disposed on a light path through which laser light from the laser light source travels;
an optical member outputting illumination light; and
a driving section displacing a relative position between the optical device and the optical member to vary at least one of an incidence position and an incidence angle, in an incidence surface of the optical member, of the laser light.
(2) The illumination device according to (1) described above, wherein the optical device includes:
a first optical surface outputting the laser light incident thereon while converging the incident laser light; and
a second optical surface outputting the laser light incident thereon while diverging the incident laser light.
(3) The illumination device according to (2) described above, wherein the first optical surface and the second optical surface are connected to allow a light path of convergent light outputted from the first optical surface and a light path of divergent light outputted from the second optical surface to be varied continuously.
(4) The illumination device according to (3) described above, wherein the first optical surface is a convex-shaped curved surface, and the second optical surface is a concave-shaped curved surface.
(5) The illumination device according to any one of (2) to (4) described above, wherein
the optical member is a fly-eye lens in which a plurality of unit lenses are two-dimensionally arranged, and
a direction in which the first optical surface and the second optical surface extend and a direction in which the unit lenses are arranged are inclined with respect to each other.
(6) The illumination device according to (1) described above, wherein the optical device is a microlens array.
(7) The illumination device according to (1) described above, wherein
the optical device is a prism array, and
a plurality of prisms, each having a convex portion that includes a pair of inclined surfaces, are disposed, in the prism array, side-by-side in a direction orthogonal to a direction in which the pairs of inclined surfaces extend.
(8) The illumination device according to (7) described above, wherein the convex portion is provided on at least one of an incidence surface and an emission surface in each of the prisms.
(9) The illumination device according to (1) described above, wherein the optical device includes a single lens or a plurality of lenses.
(10) The illumination device according to any one of (1) to (9) described above, wherein the optical member is a fly-eye lens.
(11) The illumination device according to (10) described above, wherein $\theta\ max \leq \theta th$ is satisfied, where $\theta\ max$ is a maximum value in an angle formed by a direction of travel of emission light from the optical device and an optical axis of the fly-eye lens, and $\theta th$ is an allowable incidence angle in the fly-eye lens.
(12) The illumination device according to any one of (1) to (11) described above, wherein the optical device splits the light path of the laser light incident thereon into a plurality of periodic light paths, and outputs the incident laser light.
(13) The illumination device according to any one of (1) to (12) described above, wherein the optical device has a configuration in which a plurality of unit structures are arranged one-dimensionally or two-dimensionally.
(14) The illumination device according to any one of (1) to (13) described above, wherein the driving section displaces the relative position in a reciprocating manner by a drive frequency of 15 Hz or higher.
(15) The illumination device according to any one of (1) to (14) described above, wherein the driving section oscillates at least one of the optical device and the optical member to displace the relative position.
(16) The illumination device according to any one of (1) to (15) described above, wherein
the optical device includes a plurality of optical devices disposed along an optical axis thereof, and
the driving section oscillates the plurality of optical devices in respective separate directions.

(17) The illumination device according to any one of (1) to (16) described above, wherein the light source section includes three kinds of light sources that emit red light, green light, and blue light.

(18) The illumination device according to (17), wherein at least one of the three kinds of light sources is the laser light source.

(19) A display apparatus, including:

an illumination device; and a light modulation device modulating illumination light from the illumination device based on an image signal, wherein the illumination device includes a light source section including a laser light source, an optical device disposed on a light path through which laser light from the laser light source travels, an optical member outputting the illumination light, and a driving section displacing a relative position between the optical device and the optical member to vary at least one of an incidence position and an incidence angle, in an incidence surface of the optical member, of the laser light.

(20) The display apparatus according to (19) described above, further including a projection optical system projecting, onto a projected surface, the illumination light modulated by the light modulation device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An illumination device, comprising:

a light source section including a laser light source;

an optical device disposed on a light path through which laser light from the laser light source travels;

a fly-eye lens in which a plurality of unit lenses are two-dimensionally arranged, the fly-eye lens outputting illumination light;

a collimator lens positioned between the optical device and the fly-eye lens; and a driving section displacing a relative position between the optical device and the fly-eye lens to vary at least one of an incidence position and an incidence angle, in an incidence surface of the fly-eye lens, of the laser light, wherein the optical device includes a first optical surface outputting the laser light incident thereon while converging the incident laser light, and a second optical surface outputting the laser light incident thereon while diverging the incident laser light, wherein a direction in which an upper ridgeline of at least one of the second optical surfaces extends in plan view and a direction in which edges of the unit lenses extend in plan view are inclined with respect to each other in plan view, wherein the first optical surface is a convex-shaped curved surface, and the second optical surface is a concave-shaped curved surface, and wherein a pitch of the first optical surface in an arrangement direction orthogonal to the extending direction of the upper ridgelines, and a pitch of the second optical surface in the arrangement direction are different from each other.

2. The illumination device according to claim 1, wherein the first optical surface and the second optical surface are connected to allow a light path of convergent light outputted from the first optical surface and a light path of divergent light outputted from the second optical surface to be varied continuously.

3. The illumination device according to claim 1, wherein $\theta max \leq \theta th$ is satisfied, where $\theta max$ is a maximum value in an angle formed by a direction of travel of emission light from the optical device and an optical axis of the fly-eye lens, and $\theta th$ is an allowable incidence angle in the fly-eye lens.

4. The illumination device according to claim 1, wherein the optical device splits the light path of the laser light incident thereon into a plurality of periodic light paths, and outputs the incident laser light.

5. The illumination device according to claim 1, wherein the optical device has a configuration in which a plurality of unit structures are arranged one-dimensionally or two-dimensionally.

6. The illumination device according to claim 1, wherein the driving section displaces the relative position in a reciprocating manner by a drive frequency of 15 Hz or higher.

7. The illumination device according to claim 1, wherein the driving section oscillates at least one of the optical device and the fly-eye lens to displace the relative position.

8. The illumination device according to claim 1, wherein the optical device includes a plurality of optical devices disposed along an optical axis thereof, and the driving section oscillates the plurality of optical devices in respective separate directions.

9. The illumination device according to claim 1, wherein the light source section includes three kinds of light sources that emit red light, green light, and blue light.

10. The illumination device according to claim 9, wherein at least one of the three kinds of light sources is the laser light source.

11. The illumination device according to claim 1, wherein the optical device is a second fly-eye lens, and the driving section displaces a relative position between the fly-eye lens and the second fly-eye lens.

* * * * *